US012753820B2

(12) United States Patent
Weeks

(10) Patent No.: US 12,753,820 B2
(45) Date of Patent: Oct. 6, 2026

(54) IMPACT ABSORPTION ELEMENTS, SYSTEMS, AND METHODS OF USE

(71) Applicant: Bruce V. Weeks, Mount Gilead, OH (US)

(72) Inventor: Bruce V. Weeks, Mount Gilead, OH (US)

( * ) Notice: Subject to any disclaimer, the term of this patent is extended or adjusted under 35 U.S.C. 154(b) by 0 days.

(21) Appl. No.: 17/797,798

(22) PCT Filed: Feb. 8, 2021

(86) PCT No.: PCT/US2021/017151
§ 371 (c)(1),
(2) Date: Aug. 5, 2022

(87) PCT Pub. No.: WO2021/159119
PCT Pub. Date: Aug. 12, 2021

(65) Prior Publication Data

US 2023/0063721 A1 Mar. 2, 2023

Related U.S. Application Data

(60) Provisional application No. 62/970,908, filed on Feb. 6, 2020.

(51) Int. Cl.
*F16F 9/10* (2006.01)
*A42B 3/12* (2006.01)
(Continued)

(52) U.S. Cl.
CPC .............. *F16F 9/106* (2013.01); *A42B 3/122* (2013.01); *F04B 33/00* (2013.01); *F16F 5/00* (2013.01);
(Continued)

(58) Field of Classification Search
CPC ...... F16F 9/0436; F16F 9/0418; F16F 9/0427; F16F 9/106; F16F 13/20; F16F 9/049;
(Continued)

(56) References Cited

U.S. PATENT DOCUMENTS 84,654 A * 12/1868 Somes .................. F16F 9/0418
267/35
2,994,310 A 8/1961 Hopwood
(Continued)

FOREIGN PATENT DOCUMENTS

CA 2733991 C 7/2009
CA 2850636 C 10/2013
(Continued)

OTHER PUBLICATIONS

PCT International Search Report and Written Opinion, Jun. 3, 2021.
(Continued)

*Primary Examiner* — Thomas J Williams
(74) *Attorney, Agent, or Firm* — Aaron P. McGushion

(57) ABSTRACT

An impact absorber is provided and is configured to be positioned between a protected object and an impacted object during use to prevent substantial damage to the impacted object from the impact of an external force. The impact absorber includes an outer absorption element and an inner absorption element positioned within the outer absorption element. The outer absorption element includes an outer wall enclosing a primary chamber, with the primary chamber configured to hermetically contain a first fluid under a first pressure, with the outer wall including an impacted side and a protected side, where the protected side is configured to be directed toward the protected object during use, and the impacted side is configured to be directed toward the impacted object during use. The first inner absorption element includes a first wall enclosing a first chamber, with the
(Continued)

first inner absorption element being positioned within the primary chamber with the first chamber and being surrounded by the first fluid, where the first chamber is configured to hermetically contain a second fluid under a second pressure, with the second pressure being equal to or differing from the first pressure.

18 Claims, 20 Drawing Sheets

(51) Int. Cl.
*F04B 33/00* (2006.01)
*F16F 5/00* (2006.01)
*F16F 9/04* (2006.01)

(52) U.S. Cl.
CPC .......... *F16F 9/0418* (2013.01); *F16F 9/0436* (2013.01); *F16F 9/049* (2013.01)

(58) Field of Classification Search
CPC ..... A43B 13/203; A43B 21/28; A43B 21/285; A42B 3/121; A42B 3/122
USPC ........................... 267/35, 118, 122, 126, 292
See application file for complete search history.

(56) References Cited

U.S. PATENT DOCUMENTS

| | | | | |
|---|---|---|---|---|
| 3,186,004 | A | 6/1965 | Carlini | |
| 3,462,763 | A | 8/1969 | Schneider et al. | |
| 3,849,801 | A | 11/1974 | Holt et al. | |
| 4,060,855 | A | 12/1977 | Rappleyea | |
| 4,504,044 | A | 3/1985 | Shtarkman | |
| 4,509,730 | A * | 4/1985 | Shtarkman | F16F 13/002 267/152 |
| 4,547,919 | A * | 10/1985 | Wang | B63B 7/08 428/116 |
| 4,853,980 | A | 8/1989 | Zarotti | |
| 5,025,575 | A | 6/1991 | Lakie | |
| 5,467,595 | A * | 11/1995 | Smith | B60G 17/052 280/124.16 |
| 5,915,663 | A | 6/1999 | Lee | |
| 5,950,244 | A | 9/1999 | Fournier et al. | |
| 6,289,522 | B1 | 9/2001 | Jones et al. | |
| 6,402,879 | B1 * | 6/2002 | Tawney | A43B 21/285 36/35 R |
| 6,887,047 | B2 * | 5/2005 | Grapes | F04B 43/107 417/387 |
| 6,997,218 | B1 | 2/2006 | Garcia et al. | |
| 7,069,946 | B2 * | 7/2006 | Clare, Jr. | F16K 15/044 137/515.5 |
| 7,328,462 | B1 | 2/2008 | Straus | |
| 8,046,845 | B1 | 11/2011 | Garcia et al. | |
| 8,524,338 | B2 | 9/2013 | Anderson et al. | |
| 8,739,317 | B2 * | 6/2014 | Abernethy | A42B 3/122 2/6.6 |
| 9,451,795 | B2 | 9/2016 | Krueger | |
| 9,867,416 | B2 | 1/2018 | Woolf | |
| 10,212,981 | B2 | 2/2019 | Burek et al. | |
| 10,228,036 | B2 | 3/2019 | Beyer | |
| 10,278,444 | B2 | 5/2019 | Merrel | |
| 2003/0080481 | A1 * | 5/2003 | Wang | B60G 17/0408 267/64.28 |
| 2010/0295343 | A1 | 11/2010 | Marsden et al. | |
| 2013/0125294 | A1 | 5/2013 | Ferrara | |
| 2013/0152284 | A1 | 6/2013 | Ferrara et al. | |
| 2014/0076767 | A1 * | 3/2014 | McFarland | A42B 3/121 206/521 |
| 2015/0008085 | A1 | 1/2015 | Ferrara | |
| 2016/0255900 | A1 | 9/2016 | Browd et al. | |
| 2016/0278470 | A1 | 9/2016 | Posner et al. | |
| 2016/0302496 | A1 | 10/2016 | Ferrara | |
| 2017/0196292 | A1 | 7/2017 | Reinhall et al. | |
| 2018/0303187 | A1 * | 10/2018 | Hallander | A42B 3/121 |
| 2018/0332923 | A1 * | 11/2018 | Ellis | A43B 7/144 |
| 2018/0343952 | A1 * | 12/2018 | Lachance | A42B 3/121 |
| 2023/0063721 | A1 * | 3/2023 | Weeks | F16F 9/106 |

FOREIGN PATENT DOCUMENTS

| | | | | | |
|---|---|---|---|---|---|
| CN | 105946755 | A | * | 9/2016 | |
| CN | 106195094 | A | * | 12/2016 | F16F 9/0409 |
| CN | 206336244 | U | * | 7/2017 | |
| CN | 105526297 | B | | 10/2017 | |
| GB | 814748 | A | * | 6/1959 | F16F 13/20 |
| GB | 2476839 | A | * | 7/2011 | A41D 13/0156 |
| JP | S59-093534 | A | | 5/1984 | |
| JP | S61-051035 | A | | 3/1986 | |
| JP | S63-104925 | A | | 2/1990 | |
| KR | 100394511 | | | 11/2003 | |
| KR | 100394511 | B1 | * | 11/2003 | |
| KR | 2005036123 | A | * | 4/2005 | |
| KR | 1020050036123 | A | | 4/2005 | |
| KR | 1020030071701 | B1 | | 3/2006 | |
| KR | 100894538 | B1 | | 4/2009 | |
| WO | 9606288 | A1 | | 2/1996 | |
| WO | 199606288 | A1 | | 2/1996 | |
| WO | WO-9708016 | A2 | * | 3/1997 | B60R 19/20 |
| WO | WO-03075699 | A1 | * | 9/2003 | A43B 13/203 |
| WO | 2012148582 | A2 | | 11/2012 | |
| WO | 2017132758 | A1 | | 8/2017 | |
| WO | 2018107286 | A1 | | 6/2018 | |

OTHER PUBLICATIONS

EPO Supplementary European Search Report, Feb. 27, 2024.
Japan Office Action, Apr. 28, 2025.

* cited by examiner

50
PO
55
52
53
IO
89
93
92
98
104
86
106
114
110
108
96
94
88
100
109

50
PO
53
52
70
72
IO
89
91
90
96
102
86
87
106
114
110
108
94
88
100

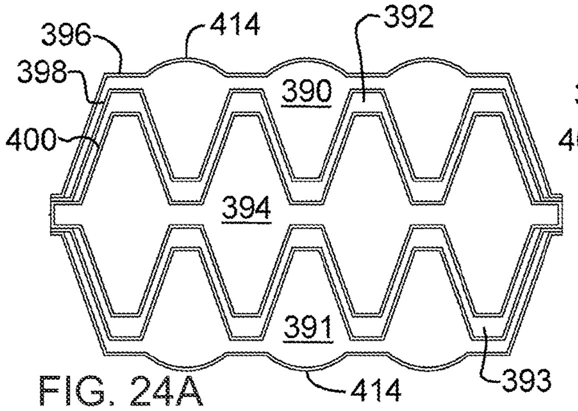
FIG. 24A
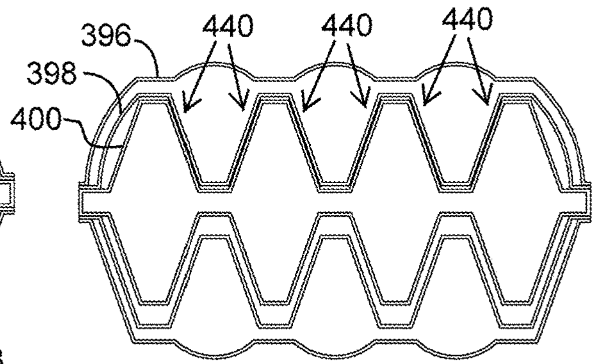
FIG. 24B
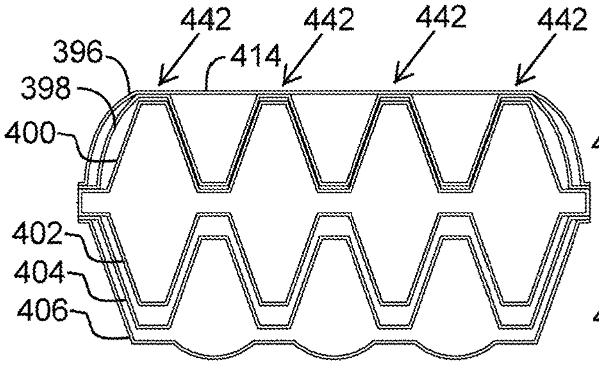
FIG. 24C
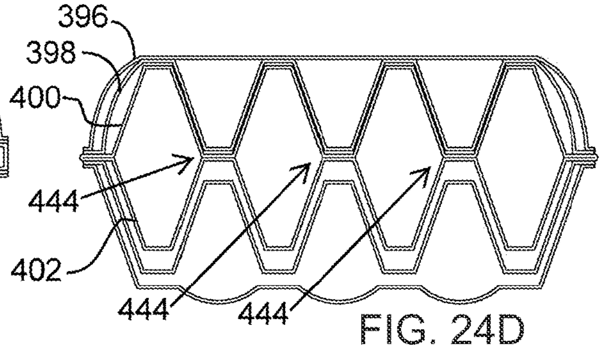
FIG. 24D
FIG. 24E
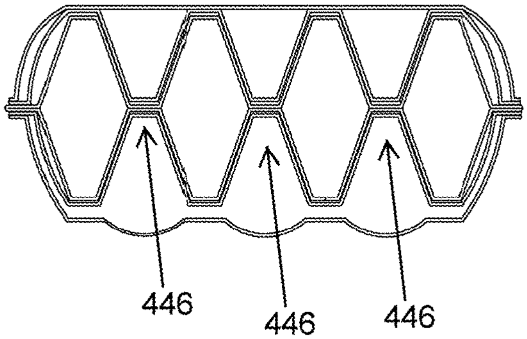
FIG. 24F
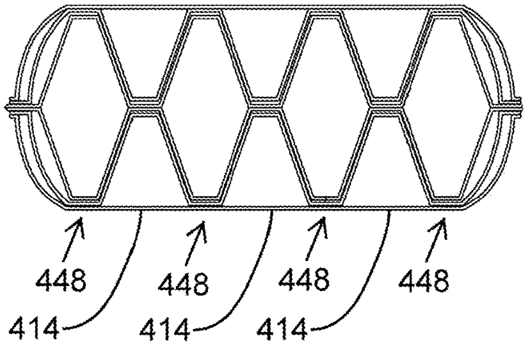
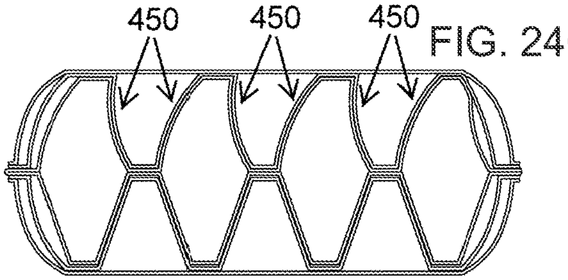
FIG. 24G
FIG. 24H
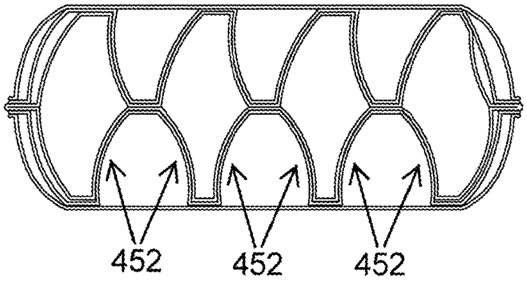

IMPACT ABSORPTION ELEMENTS, SYSTEMS, AND METHODS OF USE

BACKGROUND

The subject of this patent application relates generally to devices for absorbing impacts directed at a protected object, and more particularly to devices placed between an impacted object and the protected objected.

By way of background, many items of personal protective equipment and items of property protective equipment include rigid, flexible, or semi-rigid outer shells for absorbing impact, at least in part. One or more cushioning elements are placed between the outer shell and the protected object to provide further impact absorption and dissipation (which may take the form of webbing, foam, gel, air bladders, etc.).

Personal protective equipment is designed to provide protection to the body that is either worn on the body (human or animal) or is mounted on objects in which the body may impact. Property protective equipment is designed to provide protection to inanimate objects, such as cars, buildings, sensitive equipment, and so on. Although, existing protective equipment provide varying degrees of protection from impact, depending on the particular design, much damage may still be imparted on the protected object due to its inability to adequately control and reduce the high accelerations present in an impact.

As one of many examples of personal protective equipment, helmets are used in sport, cycling, industry, military, medicine, firefighting, motor vehicles, and other activities where head trauma is an issue. In American football, the helmets are primarily designed to absorb a portion of the linear forces imparted on the outer shell of the helmet. Some helmets are also designed to absorb a portion of the rotational forces imparted on the outer shell. However, angular acceleration (having a unit of rad/s$^2$) and linear acceleration (having a unit of m/s$^2$) of the wearer's head, measured during impact while wearing existing helmets, are still far too high and still can result in concussion for high deceleration events and cumulative brain damage for repeated low deceleration events.

SUMMARY

Aspects of the present invention teach certain benefits in construction and use which give rise to the exemplary advantages described below.

The present invention solves the problems described above by providing an impact absorber. In at least one embodiment, an impact absorber is provided and is configured to be positioned between a protected object and an impacted object during use, the impacted object configured to be impacted by an outside object. In one or more embodiments, the impact absorber includes an outer absorption element and a first inner absorption element positioned within the outer absorption element. The outer absorption element includes an outer wall enclosing a primary chamber, with the primary chamber configured to hermetically contain a first fluid under a first pressure, with the outer wall including an impacted side and a protected side, where the protected side is configured to be directed toward the protected object during use, and the impacted side is configured to be directed toward the impacted object during use. The first inner absorption element includes a first wall enclosing a first chamber, with the first inner absorption element being positioned within the primary chamber with the first chamber and being surrounded by the first fluid, where the first chamber is configured to hermetically contain a second fluid under a second pressure, with the second pressure being equal to or differing from the first pressure.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 24A-H are cross-sectional end views of the impact absorber embodiment of FIG. 22, illustrating the various stages of compression under an increasing load and/or a large load over time;

The above-described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
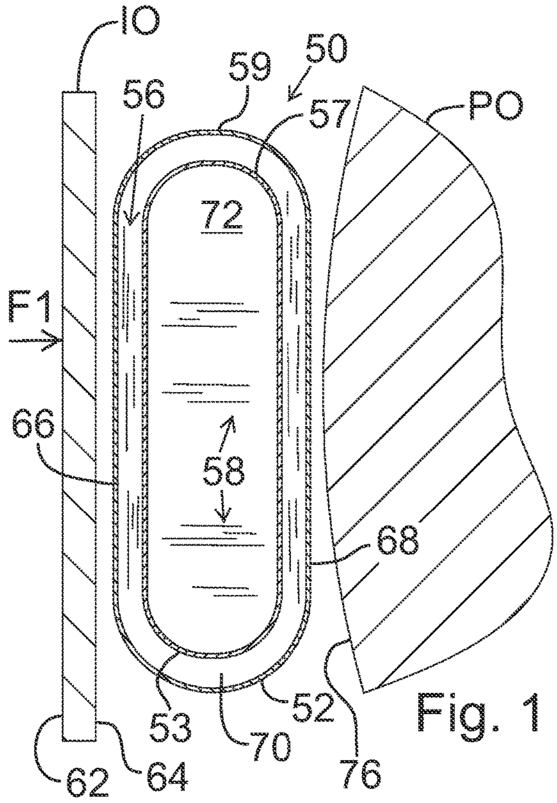
FIG. 1 is a schematic cross-sectional view of an exemplary impact absorber, in accordance with at least one embodiment.

Looking first at FIGS. 1-4, four embodiments of the present invention are illustrated schematically in cross-section to each illustrate the basic construction of one or more embodiments of the present impact absorber 50. FIG. 1 illustrates a first embodiment of the impact absorber 50 positioned between an impacted object IO and a protected object PO. In at least some embodiments, the protected object PO and the impacted object IO may separate from, selectively integral with, or coupled with the present impact absorber 50, depending on the particular application, which will be discussed below in greater detail. Here, the protected object PO includes a protected surface 76 directed toward the impact absorber 50. The impacted object IO includes an outer surface 62 directed away from the impact absorber 50 and an inner surface 64 directed toward the impact absorber 50. In one or more example embodiments, the protected object PO is a person's head; and the impacted object IO is the outer shell of a helmet. The impacted object IO is struck, pushed, or otherwise impacted by a third object, which may be ay number of objects, including falling construction objects, another helmet, a vehicle, a hard surface, etc. In one or more embodiments, the impact absorber 50 is operable in itself, and does not require the presence of the impacted object IO. Further, the proximity, orientation, and location of the impact absorber relative to the protected object illustrated in the example embodiments herein are exemplary, and may vary according to the requirements of the specific application. For example, the impact absorber 50 can be located in a position spaced apart from the protected object PO (e.g., suspended next to the protected object PO, attached to a supporting structure, or the like).

In this example embodiment, the impact absorber 50 includes an outer absorption element 52 and an inner absorption element 53 positioned at least in part within the outer absorption element 52. Here, the inner absorption element 53 includes a wall 57 defining a first chamber 72 hermetically containing a second fluid 58. In this example, the first chamber 72 of the inner absorption element 53 is completely surrounded by a first fluid 56 hermetically contained within the outer absorption element 52. Although the inner absorption element 53 is shown being positioned completely within and completely surrounded by the first fluid 56 (e.g., where the inner absorption element 53 does not have a common wall shared with the outer absorption element 52, with an attachment to one another or without), in at least one embodiment, the plies of material stacked atop one another (four or more plies of sheet material to make an inner and outer absorption element assembly) are welded or pinched together (in a blow molding process or the like) about their common perimeters and/or other areas to create the two chambers. In this arrangement the inner absorption element 53 is connected by one or more edges to the corresponding edges of the outer absorption element 52, yet the first chamber 72 is still completely surrounded by the first fluid 56 held with the primary chamber 70 defined between (e.g., within the interstice therebetween) the inner absorption element 53 and the outer absorption element 52. Further, in some blow molding processes, vacuum forming, and other common plastic forming processes, allows the outer absorption element 52 and one or more of the inner absorption elements can share common wall or walls within certain regions.

Even though there may be one or more common walls between two or more inner absorption elements or between one or more inner absorption elements and the outer absorption element, the first fluid covers a sufficient area of the walls defining the chambers of one or more of the inner absorption chambers to permit application of pressure onto the inner absorption elements such that they are deformed, as is described in further detail below. In one or more embodiments, substantially all of the wall defining the fluid chamber within the inner absorption element is surrounded by the first fluid 56; for example, at least 95% of the wall defining the fluid chamber within the inner absorption element is surrounded by the first fluid 56, or at least 90% of the wall defining the fluid chamber within the inner absorption element is surrounded by the first fluid 56, or at least 85% of the wall defining the fluid chamber within the inner absorption element is surrounded by the first fluid 56, or at least 80% of the wall defining the fluid chamber within the inner absorption element is surrounded by the first fluid 56, or at least 70% of the wall defining the fluid chamber within the inner absorption element is surrounded by the first fluid 56, or at least 60% of the wall defining the fluid chamber within the inner absorption element is surrounded by the first fluid 56, or at least 50% of the wall defining the fluid chamber within the inner absorption element is surrounded by the first fluid 56, or at least 40% of the wall defining the fluid chamber within the inner absorption element is surrounded by the first fluid 56, or at least 30% of the wall defining the fluid chamber within the inner absorption element is surrounded by the first fluid 56, or at least 20% of the wall defining the fluid chamber within the inner absorption element is surrounded by the first fluid 56. In the case where 100% of the of the wall defining the fluid chamber within the inner absorption element 53 is surrounded by the first fluid 56, the inner absorption element 53 (or one or more, or all, of the inner absorption elements may be free-floating within the outer absorption element 52 (e.g., not directly attached or sharing a common seam to the outer absorption element 52, but may be attached by a strip of material of the like).

Again, referring to FIG. 1, the impact absorber 50 includes a second fluid 58 contained within the inner absorption element 53; with the inner absorption element 53 contained within the outer absorption element 52, and with the first fluid 56 surrounding the part or whole of the inner wall 57 that defines the first chamber 72. The first fluid 56 fills the primary chamber 70 and is pressurized to a first pressure (for example, a pressure between 0.2 and 5 psi, and/or between 0.1 psi and 1 psi). The second fluid 58 fills the first chamber 72 and is pressurized to a first pressure (for example, a pressure between 0.1 and 5 psi, and/or between 0.1 psi and 1 psi), where the first pressure and the second pressure are different in at least one embodiment. For example, the first pressure can be greater than or less than the second pressure. In one or more embodiments, the first and second pressure are the same or substantially the same (e.g., within 5% or 10% or 20% of one another). Although the first fluid 56 and the second fluid 58 are air and/or are the same fluid in one or more embodiments, other appropriate fluids or combination of fluids may be used (gas, liquid, gel, glycol, etc. or a combination or one or more). In one or more embodiments, the first fluid 56 and the second fluid 58 can be different fluids. Although, relatively low pressures may be used in certain application (e.g., less than 100 psi, or less than 50 psi, or less than 10 psi, or less than 5 psi, or less than 1 psi), in industrial, motor vehicle, or other applications where high impact forces are expected, the pressure of one or more of the fluids may be greater than 100 psi, or greater than 500 psi, or greater than 1,000 psi, or greater than 1,500 psi, or greater than 2,000 psi, or greater than 2,500 psi, or greater than 3,000 psi.

The material properties of the inner wall 57 and the outer wall 59 (the wall defining the outer limits of the primary chamber 70) can be similar or different. And, look forward to FIG. 2, the material properties of the inner wall 57, the inner wall 61, and the outer wall 59 can be similar or different from one another. For example, the wall thickness of the inner wall 57 and the outer wall 59 may differ or may be similar or substantially similar (e.g., within 5% or 10% or 20% of one another). In one or more embodiments, the material selected is a thermoplastic (such as linear low-density polyethylene—LLDP, thermoplastic rubber—PPE, e.g., TPE, TPO, or TPU, or other appropriate elastomeric material), whose pliability varies according to the thickness (the thinner the material, the more pliable the material is). The type of material for each of the inner wall 57 and the outer wall 59 may be the same or may differ, depending on the application. For example, in one or more embodiments, the material selected and/or the thickness of the material of the inner absorption element 53 can differ from that of the outer absorption element 52. In one or more example embodiments, the outer wall 59 can be made of a solid sheet material (e.g., with the ability to create a hermetically sealed chamber), a mesh material (e.g., not hermetically sealed), a strap material, or other material or design that contains the first chamber 72.

Still looking at FIG. 1, the impact absorber 50 is positioned between the impacted object IO and the protected object PO. The impacted side 66 of the impact absorber 50 can be spaced apart from or contacting the inner surface 64 of the impacted object IO. Similarly, the protected side 68 can be spaced apart from or contacting the protected surface 76 of the protected object PO. Additionally, in one or more embodiments, the impact absorber 50 is compressed between impacted object IO and the protected object PO during use, such that the impacted side 66 and the protected side 68 are brought into contact, or into further surface contact, or forced into higher pressure contact with the inner surface 64 and protected surface 76, respectively. In certain applications, such as use within helmets, the impact absorber 50 can be fitted closely to the persons head and to the inner surface 64 of the helmet.

An arrow representing force F1, indicates an exemplary force striking the outer surface 62 of the impacted object IO, which may strike from any direction, normal to or oblique to the outer surface 62. Depending on where the force strikes the impacted object IO and the angle of the resultant force relative to the outer surface 62, the force can impart a one or both of a linear acceleration and an angular acceleration on the impacted object IO. The function of the present impact absorber 50 is to absorb at least a portion of the impact force and the resulting acceleration incident on the protected object PO. Although FIGS. 1-4, illustrate a schematic oblong cross-section of the present impact absorber 50, the impact absorber 50 is, in one or more embodiments, generally elongated (e.g., the figures represent a cross-sectional slice of long embodiment), such that a large area of the protected side 68 is in contact or can be placed into contact with the protected side 68 of the protected object PO, and a large area of the impacted side 66 is in contact or can be placed into contact with the inner surface 64 of the impacted object IO.

Upon impact of force F1, the impacted object IO, such as a helmet shell, is configured with a material property or properties sufficient to distribute the stress of force F1 over a relatively large area (e.g., such as the combination of rigid and resilient properties of shells present in many existing helmets) compared to the area of direct contact from an outside object (e.g., another helmet, a baseball, a hard surface, and so on). The force distribution area can be more than 1.5 times larger than the force contact area, and/or more than 2 times larger than the force contact area, and/or more than 3 times larger than the force contact area, an/or more than 4 times larger than the force contact area, and/or more than 5 times larger than the force contact area, and/or more than 10 times larger than the force contact area. The various properties measured for the impacted object IO can include Rockwell hardness, compressive strength, impact resistance (e.g., using the Izod impact strength test), Youngs modulus, tensile yield stress, ultimate tensile strength, flexural yield strength, and the like.

As force F1 is distributed over the force distribution area of the impacted object IO, the present impact absorber 50 begins to compress over a compression region located beneath the force distribution area (and, in one or more embodiments, beyond the force distribution area), where the outer absorption element 52 and the inner absorption element 53 deform (although, the deformation of each element can differ in magnitude and in kind, depending on the material properties, the wall thicknesses, the fluid pressures, and the geometry and shape of the elements). In one example embodiment, in response to force F1, the outer absorption element 52 compresses in the compression region and expands in other regions, as one or both of the first fluid 56 and the second fluid 58 are squeezed out at least partially from the compression region and into a non-compressed or expanded region elsewhere within the impact absorber 50. The elastic deformation of the outer absorption element 52 and the inner absorption element 53 in combination with the forced movement of the first fluid 56 and the second fluid 58 through the primary chamber 70 and the first chamber 72, respectively, absorbs at least some or most of the impact energy of force F1, to reduce the linear and angular accelerations experienced by the protected object PO to within safe ranges.

Figure 17:
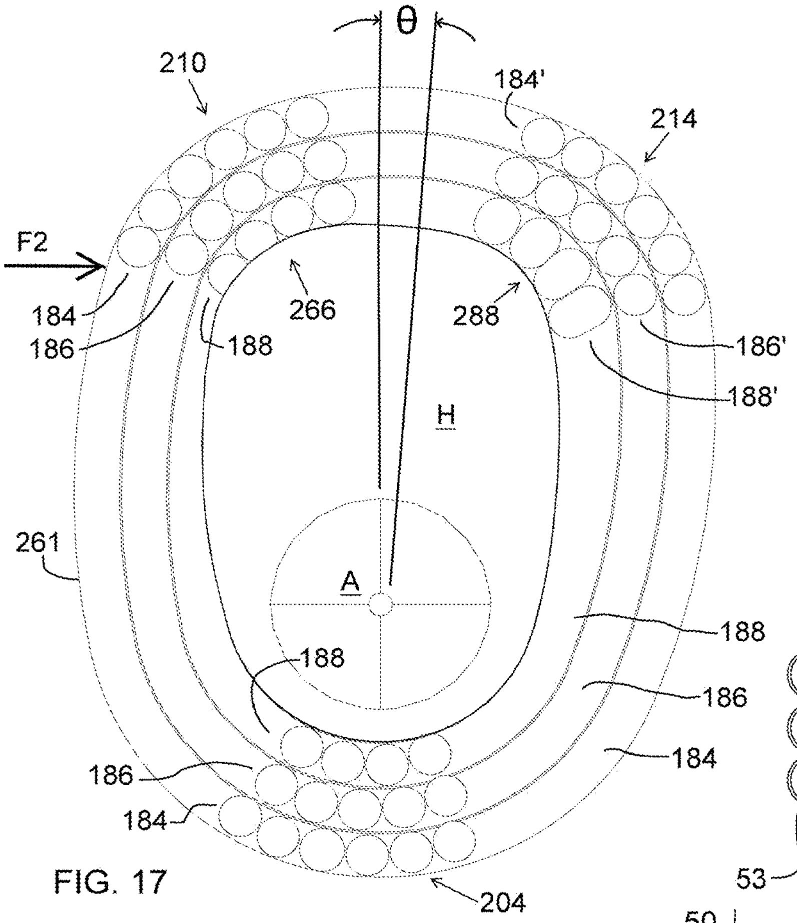
FIG. 17 is a cross-section top view of the inner absorption element assembly of FIGS. 15 and 16 inserted within a helmet and illustrating one possible deformation experienced during a glancing impact and rotational effective angle.

The shape of the impact absorber 50 of FIG. 1, for example, can be modified to a variety of configurations according to the specific application. In at least one example embodiment, the impact absorber 50 can be an elongated tube, where the outer absorption element 52 and the inner absorption element 53 are both tube-like (e.g., elongated, with a round, oval, flattened, or other appropriate cross-sectional shape) and both are sufficiently long to permit travel of the first fluid 56 and the second fluid 58 from the compressed region beneath and adjacent to the point of impact to another region or regions away from the point of impact. The tubes can be perpendicular to the horizontal travel of the fluid as shown in FIG. 17. The lengths of the outer absorption element 52 and the inner absorption element 53 can be the same or substantially similar (e.g., with 2% of the same length, or within 5% of the same length, or within 10% of the same length); or alternatively, the inner absorption element 53 can be made substantially shorter than the outer absorption element 52 (e.g., 75% as long, 50% as long, etc.), or any length in between.

Figure 2:
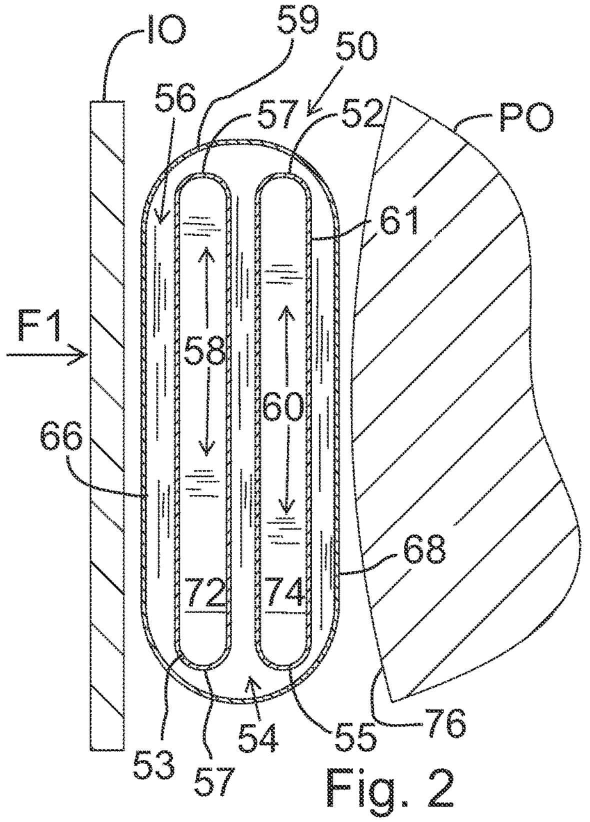
FIG. 2 is a schematic cross-sectional view of another exemplary impact absorber, in accordance with at least one embodiment.

Referring now to FIG. 2, another exemplary embodiment of the present impact absorber 50 is schematically illustrated. Instead of just a single inner absorption element 53 as is illustrated in FIG. 1, there is a second inner absorption element 55 positioned within the outer absorption element 52. The second inner absorption element 55 includes a wall 61 defining a second chamber 74 hermetically containing a third fluid 60. In this example, the second chamber 74 of the second inner absorption element 55 is completely surrounded by the first fluid 56 hermetically contained within the outer absorption element 52, and is positioned next to the inner absorption element 53, between the inner absorption element 53 and the protected side 68 of the outer absorption element 52. The second inner absorption element 55 may be similar in construction or differ in construction compared to the inner absorption element 53. For example, the thickness of the wall 57 of the inner absorption element 53 may be thicker or thinner than the second inner absorption element 55; the second fluid 58 may be the same or differ from the third fluid 60 (e.g., differing fluids may be chosen based on density, state of matter, compressibility, etc.); the cross-sectional shape (and other dimensional characteristics) may differ or be the same between the inner absorption element 53 and the second inner absorption element 55. The second inner absorption element 55 may be connected to or separate from one or both of the outer absorption element 52 and the inner absorption element 53; and the inner absorption element 53 may have the same or differing deformation characteristics than the second inner absorption element 55. Each of the outer absorption element 52, the inner absorption element 53, and the second inner absorption element 55 can be set to differing pressures or the same pressure.

Figure 3:
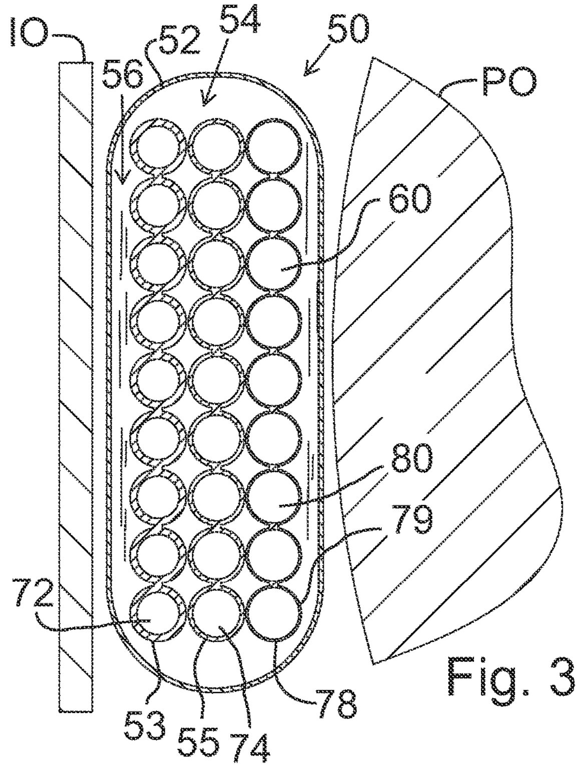
FIG. 3 is a schematic cross-sectional view of yet another exemplary impact absorber, in accordance with at least one embodiment.
Figure 4:
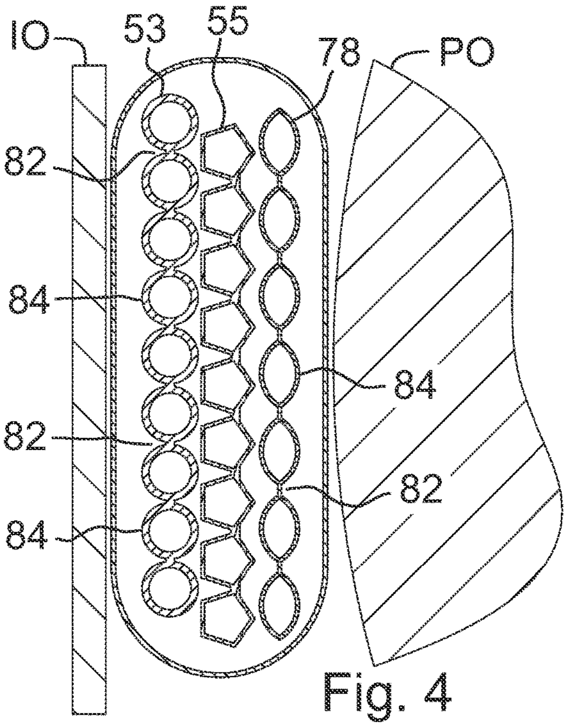
FIG. 4 is a schematic cross-sectional view of still another exemplary impact absorber, showing inner absorption elements of varying cross-sectional shape, in accordance with at least one embodiment.

FIGS. 3 and 4 schematically illustrates yet another exemplary embodiment of the present impact absorber 50. The inner absorption element 53 and the second inner absorption element 55 of FIGS. 1 and 2 were configured as a single chambers or bladders, with no divisions within the chambers to create smaller sub-chambers. During the manufacturing process (such as using a blow molding process, vacuum forming, and other common plastic forming processes), one or more elongated seams 82 (which can also be a web) are created to separate the chamber into two or more sub-chambers 84. In these examples, the sub-chambers 84 are elongated chambers (which are also described herein as elongated tubes). In one example manufacturing process, the elongated seams 82 can be created using pinch off techniques during a blow molding process, creating a plurality or multiplicity of elongated chambers 84, fluidly connected with or fluidly isolated from one or more of the other elongated chambers 84.

It can be seen that a third inner absorption element 78 is positioned within the outer absorption element 52 in the impact absorber 50 of FIGS. 3 and 4. The third inner absorption element 78 includes a wall 79, along with the plurality of elongated seams 82, defining a third chamber 80 hermetically containing a fourth fluid 81. In this example, the third chamber 80 of the third inner absorption element 78 is completely surrounded by the first fluid 56 hermetically contained within the outer absorption element 52, and is positioned next to the second inner absorption element 55, between the second inner absorption element 55 and the protected side 68 of the outer absorption element 52. The third inner absorption element 78 may be similar in construction or differ in construction compared to the inner absorption element 53 and the second inner absorption element 55.

In this example, the wall 57 of the inner absorption element 53 is thickest; the wall 61 of the second inner absorption element 55 is thinner than the inner absorption element 53; and the wall 79 of the third inner absorption element 78 is thinner than both the inner absorption element 53 and the second inner absorption element 55. However, the thickness of the wall can be the same, in one or more embodiments. One of the purposes of the varying wall thickness is to provide greatest resistance to deformation in the inner absorption elements closest to the inner surface 64 of the impacted object IO, which experience a greater level of force during impact, compared to the inner absorption elements closest to the protected object PO. Here, the third inner absorption element 78 is closest to the protected object PO, and can apply a pressure on the protected object PO through the protected side 68 of the outer absorption element 52. The relatively thin wall of the third inner absorption element 78 provides gentle and protective contact (through protected side 68) to the protected object PO, such as a person's head, where comfort and safety are critical aspects. The thicker-walled inner absorption element 53 and second inner absorption element 55 would be sufficiently thick to avoid total collapse of either one or both of the chambers 72, 74 under most impact scenarios. The fluid pressures of each of the chambers 72, 74, 80 can be set differently or the same. In one or more embodiments, the fluid pressure within chamber 80 would be lower than the fluid pressures set in chambers 72 and 74. The fluid pressures are set to permit varying degrees of deformation of and/or resistance to each inner absorption element (and for the outer absorption element 52). The first pressure of the outer absorption element 52 can also be set, in one or more embodiments, to a first pressure that, when under the pressure of an impact, the first fluid 56 applies an equalized pressure on each of the inner absorption elements 53, 55, 78 to cause collapse and/or deformation of the inner absorption elements 53, 55, 78, in addition to the mechanical deformation caused by the impacted object IO moving into an physically crushing the outer absorption element 52 and the inner absorption elements 53, 55, 78.

The embodiments of FIGS. 3 and 4 are similar in at least some ways, except the lattice-like arrangement of the stacked inner absorption elements 53, 55, 78 differs. In FIG. 4, some of the tubes of the elongated chambers 84 stack to form a hexagonal arrangement, where the center of each elongated chamber 84 is fitted in the nook created by each of the elongated seams 82. And, in FIG. 3, the tubes of the elongated chambers 84 stack to form a cubic arrangement, where the center of each elongated chamber 84 is aligned with the neighboring tube centers, touching at approximately the tangents. FIGS. 3 and 4 illustrate that the individual chambers can vary in cross-sectional shape and wall thickness. FIG. 3 illustrates a circular cross-sectional shape of the chambers, where each of the inner absorption elements 53, 55, 78 has a differing wall thickness. FIG. 4 illustrates a circular, a hexagonal, and an oblong (e.g., an elliptical, oval, a vesica piscis with radiused or sharp corners or other lens-like shape, etc.).

FIGS. 5, 6, 7A-B, and 39 illustrate a schematically represented inflation system 87 compatible with the present impact absorber 50. Although the prior figures did not show a means to inflate the inner absorption elements 53, 55, 78 and the outer absorption element 52. Each of these bladders can be prefilled to preset pressures, filled on-site to a prescribed pressure or a regulated pressure by any available pump means (such as a compressor, manual pump, oral inflation, etc.) or include an integral or attachable means to inflate the bladders. As discussed above, each of the inner absorption elements 53, 55, 78 and the outer absorption element 52 may be inflated to a specific pressure with their respective fluids; and these pressures can be set differently or the same.

In one or more embodiments, the present valve assembly 86 can be utilized for filling each bladder to a specific pressure using a single fluid source (e.g., a pump, oral inflation, compressed fluid source, etc.). Looking first at FIG. 5, an exemplary valve assembly 86 is illustrated in simplified form. The valve assembly 86 includes a valve body 106 having formed therein a first check valve 100 in parallel with a second check valve 102, a fluid manifold 108 fluidly communicating with each of the first check valve 100 and the second check valve 102 and in fluid communication with a fluid source—a manual bulb pump 110 in this example—in direct fluid communication or through a tube 114. In one or more embodiments, the first control valve 88 includes the first check valve 100 and the first on/off valve 94 in series. In one or more embodiments, the second control valve 90 includes the second check valve 102 and the second on/off valve 96 in series. In one or more embodiments, the first on/off valve 94 and the second on/off valve 96 may be excluded. The first on/off valve 94 and the second on/off valve 96 (and any other on/off valves of the present system) may be chosen from many known valves that selectively stop the flow of fluid (e.g., pinch valves, Schrader valves, quarter turn shut off valves, ball valves, a simple kink in the tube, and other appropriate means to shut the flow of fluid off).

In one or more examples, the valve body 106 is excluded or is included minimally as part of a framework or other means to hold the first check valve 100 and the second check valve 102 to the fluid manifold 108 and pump 110. The pump 110 may be integrally formed within the valve assembly 86 or detachable (e.g., a needle valve, a pneumatic tire valve, an oral inflation valve, or other compatible inflation means and/or valve). The tube 114 can be configured to stow adjacent to the impact absorber 50 when not in use or detach from the valve assembly 86. The valve assembly 86 further includes a first on/off valve 94 and a second on/off valve 96 positioned between the first check valve 100 and the first chamber 72, and a second on/off valve 96 between the second check valve 96 and the primary chamber 70. Inlet 97 provides a conduit for fluidly communication between the first check valve 100 and the first chamber 72. Inlet 89 provides a conduit for fluidly communication between the second check valve 102 and the primary chamber 70.

Figure 6:
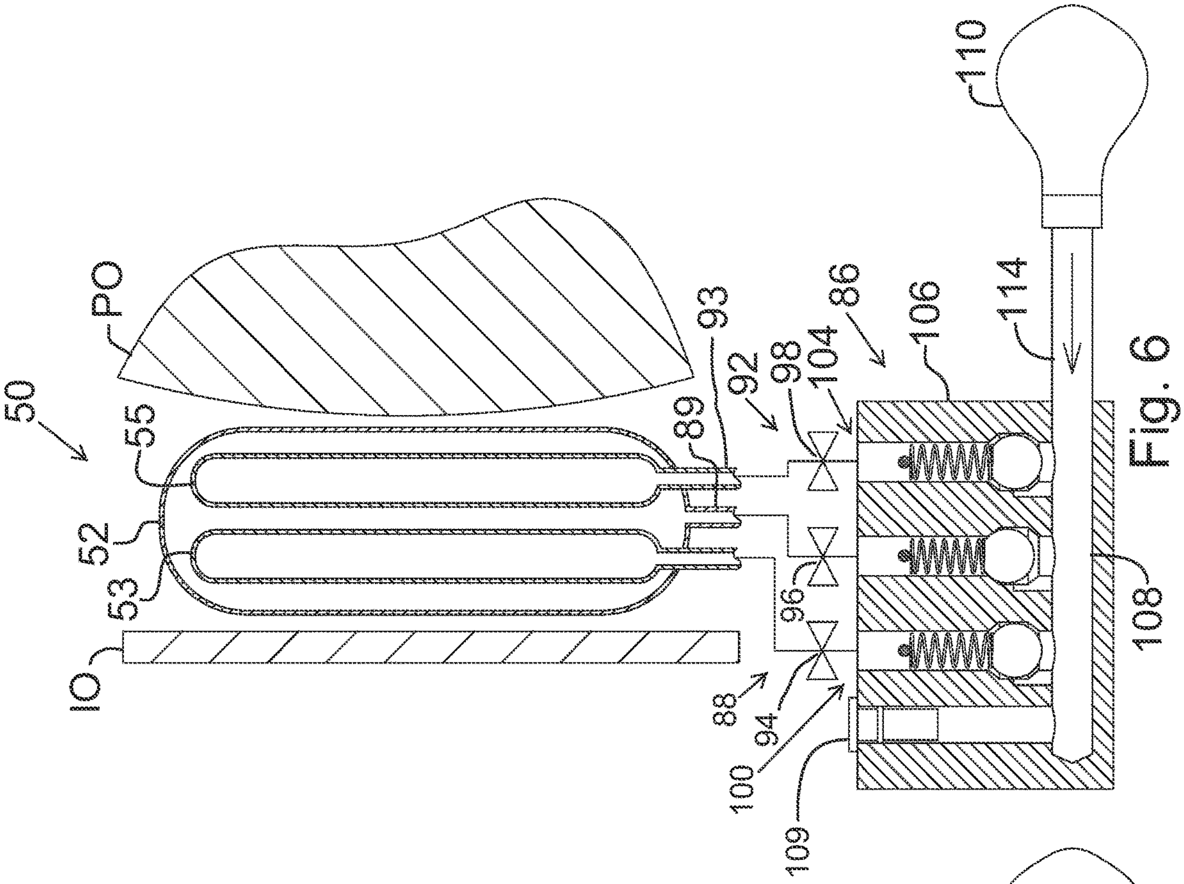
FIG. 6 is a schematic cross-sectional view of another exemplary impact absorber with an optional inflation system, in accordance with at least one embodiment.
Figure 5:
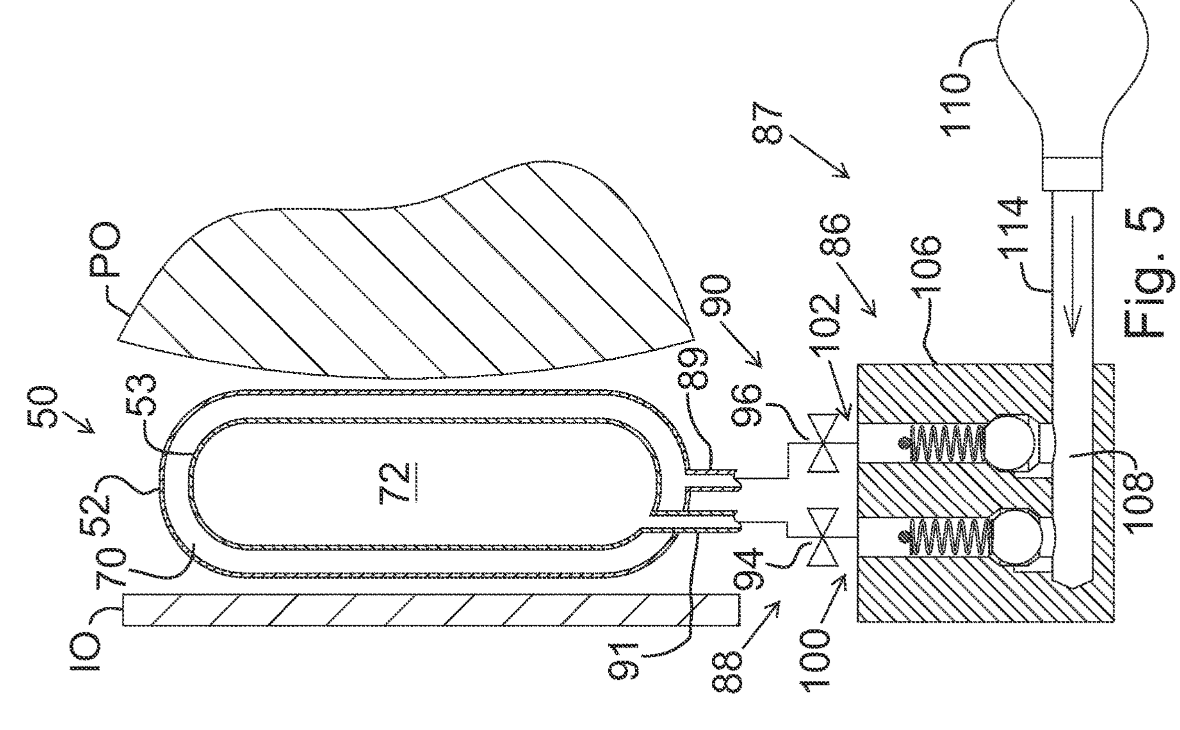
FIG. 5 is a schematic cross-sectional view of an exemplary impact absorber with an optional inflation system with an audible pressure release valve, in accordance with at least one embodiment.

The system of FIG. 6 is similar in construction to the system of FIG. 5, except the valve assembly 86 is adapted to fill an impact absorber 50 with two inner absorption elements 53, 55. Thus, the valve assembly 86 includes a first control valve 88, a second control valve 90, and a third control valve 92, all fluidly connected on the inlet side to a common fluid manifold 108. The third control valve 92 includes a third check valve 104 in series to a third on/off valve 98, with the third on/off valve 98 downstream from the third check valve 104 and before the inlet 93 to the second inner absorption element 55. Of course, the number of control valves can be greater than three, in which additional control valves can be arranged in parallel along the fluid manifold 108 and/or multiple valve assemblies can be used in conjunction to fill more complex impact absorbers, each having multiple valve assemblies. An audible pressure release valve 109 (or an ordinary pressure release valve) is in fluid communication with the manifold 108 can be provided, and is configured to release excess fluid pressure once all of the control valves 88, 90, 92 are closed. The audible pressure release valve 109 (e.g., a squeaker reed or a "squeaky valve" or the like) is calibrated (e.g., selected) to emit a sound when a predetermined pressure is exceeded within the manifold, where the predetermined pressure is greater than the preset fluid pressures of the absorption elements 52, 53, 55. In this way, once the absorption elements 52, 53, 55 are filled with fluid to the present pressure and the respective control valves 88, 90, 92 are closed, the fluid will flow through the audible pressure release valve, alerting the user to stop inflating.

Figures 7A, 7B:
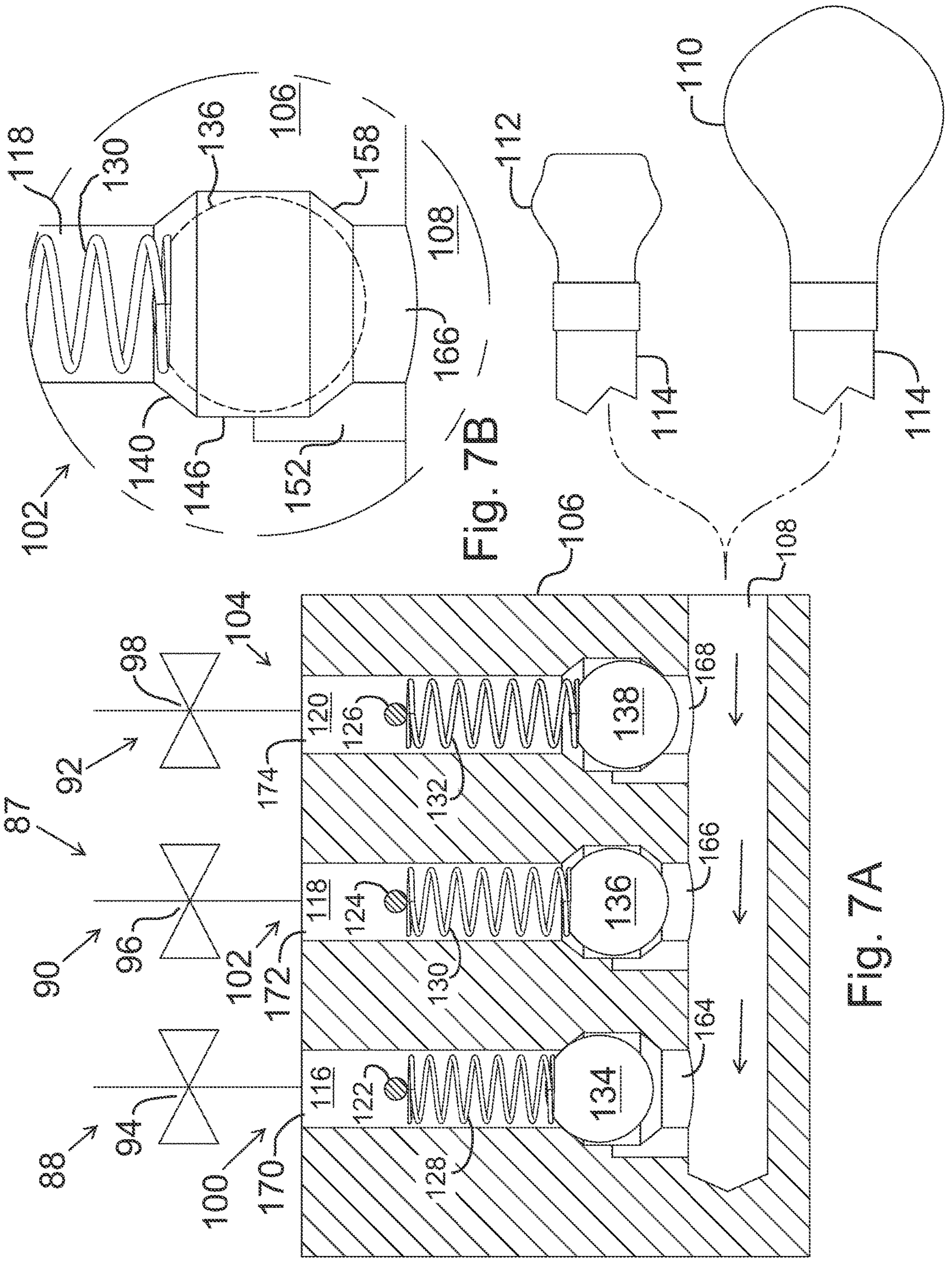
FIG. 7A is a schematic cross-sectional magnified view of the optional inflation system of FIG. 6.
FIG. 7B is a schematic cross-sectional magnified view of the optional inflation system of FIG. 7B, illustrating one of the control valves further magnified.

Referring now to FIGS. 7A-B, magnified views of FIG. 6 are illustrated to more clearly describe the operation of the present inflation system 87 compatible with the present impact absorber 50. As is readily apparent, the inflation system 87 and the impact absorber 50 can be used together as a system or separately, in different applications. The inflation system 87 can be used in a wide variety of applications outside inflating the impact absorber 50. Also, the impact absorber 50 can be inflated with known inflation means; and the inflation system 87 is not required. However, the inflation system 87 is uniquely capable of quickly and accurately inflating the multiple bladders of the impact absorber 50, each to a preset pressure. Although each control valve assembly is connected to a single bladder, a control valve can be connected to multiple bladders (the chambers of the absorption elements), if those bladders are to be filled with the same fluid at the same pressure. Further, one or more of the chambers can filled at the factory or facility other than the field. For example, the one or more of the inner absorption elements and the outer absorption element may be optionally filled with a fluid one or more selected pressures and sealed upon their manufacture, such that filling by the user is not possible.

The purpose of the control valves 88, 90, 92 being arranged in parallel is to permit the filling/inflation of multiple bladders with fluid (e.g., air or other appropriate fluid), each with a preset pressure. As each individual absorption element 52, 53, 55 reaches the preset pressure, the control valve associated with that absorption element shuts off fluid flow to that absorption element, while permitting other higher-pressure absorption elements to continue inflation, with the fluid provided through the manifold 108 from a fluid source. Once all of the absorption elements 52, 53, 55 are filled to their respective preset pressures, all of the control valves 88, 90, 92 will close, so that no more fluid enters the absorption elements 52, 53, 55, even if fluid continues to be delivered to the manifold 108.

It can be seen in FIG. 7A that a first passage 116, a second passage 118, and a third passage 120 are formed within the valve body 106, each fluidly connecting the fluid manifold 108 with the respective on/off valve 94, 96, 98. During the inflation process, fluid is introduced from the fluid source (such as manual pump 110, oral valve 112, or through use of known pneumatic tire valves, such as a Schrader valve or the like) flows through manifold 108, and enters the first passage 116, second passage 118, and third passage 120 through inlets 164, 166, 168, respectively, and exiting the check valves 100, 102, 104 through outlets 170, 172, 174. Each check valve 100, 102, 104 includes a spring 122, 124, 126 trapped between a pin 122, 124, 126 and a ball 134, 136, 138. Each spring 122, 124, 126 (a compression coil spring in the illustrated embodiment) has a differing spring constant (or, at the very least, a differing setup or other property which affects each ball's 134, 136, 138 ability to move within its respective expanded portion 146), such that fluid flows through the inlets 164, 166, 168 when the fluid pressure is insufficient to move the balls 134, 136, 138 against the spring force to the closed position.

Looking at FIG. 7B, a magnified view of the second check valve 102 is illustrated and representative of the remaining check valves 100, 104. Thus, in describing the second check valve 102, the remaining check valves 100, 104 are similarly described. The second passage 118 is formed in the valve body 106, communicating fluidly between the manifold 108 and the chamber of one of the absorption elements (which one depends on the specific arrangement, and can vary according to design), through the on/off valve 96. The on/off valve 96 can be excluded in one or more embodiments. The ball 136 (shown in phantom for greater clarity of surrounding structure) is confined to travel within the expanded portion 146 of the second passage 118, trapped between the valve seat 140 and the limiter 158 (e.g., a necked portion, a pin, a shoulder, or similar reduction or partial blockage in the expanded portion 146 to prevent the ball 136 from falling out of the expanded portion 146). In one or more embodiments, the limiter 158 can be a second valve seat opposite the valve seat 140. A spring 130 is captured between the pin 124 and the ball 136, with the spring either connected to the ball 136 or configured to bear against the ball 136 under pressure. The spring 130 bears against the ball 136 (connected or not) to bias the ball 136 away from valve seat 140, thus biasing the check valve 102 to a normally open position. A fluid bypass 152 is provided in one or more embodiments to permit the passage of fluid past the limiter 158, even if the ball 136 is bearing against the limiter 158. The fluid bypass 152, in one or more embodiments, is made by cutting a notch or similar cavity from one side of the expanded portion 146, the limiter 158, and the inlet 166.

During an inflation procedure, fluid flows from the fluid source and into the fluid manifold 108. Still just looking at check valve 102 (keeping in mind that the remaining check valves operate similarly, but at differing pressure set points), fluid enters the second passage 118 through inlet 166. As the fluid pressure is initially low (presuming the absorption element, outer absorption element 52 in this case, is under-inflated), the ball 136 is not seated within the valve seat 140 and fluid is permitted to travel through the second passage 118 and past the open on/off valve 96. As fluid is pumped into the manifold 108, the fluid pressure increases and begins to force the ball 136 toward valve seat 140 against the bias of spring 130, provided the force of the fluid pressure applied to the ball 136 is greater than the spring force. Upon reaching the preset fluid pressure, the ball 136 is forced upward by pressure against the valve seat 140, closing off fluid flow through passage 118, as the preset fluid pressure within the primary chamber 70 has been obtained.

Supposing, in this example procedure, the remaining passages 116, 120 remain open (where the check valves for those passages are set at higher pressures than check valve 102) and passage 118 is closed, fluid can still pass through passages 116, 120, delivered from manifold 108. As the user continues to pump fluid into the manifold 108, the spring with the second weakest spring constant is compressed by its associated ball, until the ball seats against and seals against the associated valve seat. As the user further pumps the fluid into the manifold 108, the check valve having the spring with the highest spring constant (i.e., the strongest spring that resists compression the most), is forced closed as the preset pressure for that check valve is reached. In this way, the check valves 100, 102, 104 close one at a time as the pressure increased to each check valve's pressure set point. Of course, in one or more embodiments, it may be a desire to have two or more absorption elements at the same pressure. In that case, a single check valve can be used to fill the two or more absorption elements, or two different check valves can be set at the same preset pressure (e.g., the springs have the same spring constant), such that they will close at the same time at the same pressure.

Looking now at FIGS. 8-11, the inner absorption elements are shown in several of the many available cross-sectional shapes, illustrating potential collapse scenarios due to the application of pressure alone (not including any mechanical or contact deformation. FIGS. 8A-C illustrate a circular inner absorption element 176 positioned within an outer absorption element 177, with the first fluid 56, within the primary chamber 70, surrounding the circular inner absorption element 176 with the second fluid 58 within the first chamber 72. It can be appreciated that, although the first fluid 56 and the second fluid 58 are not illustrated in FIGS. 8-11, the fluid is present within their respective chambers, filling or at least partially filling the volume of the chambers (the fluids are not shown for clarity).

Figure 8A:
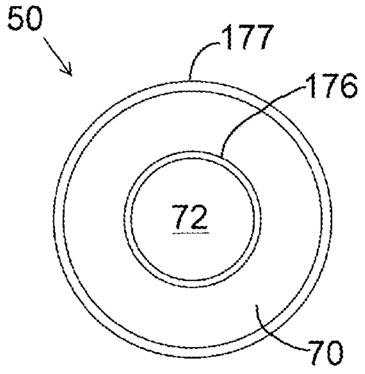
FIGS. 8A-C are schematic cross-sectional views of an exemplary impact absorber, illustrating a circular cross-sectional shaped inner absorption element, illustrated in (A) an unloaded mode, (B) a loaded mode where the pressure between the inner absorption element and outer absorption element is greater than the pressure with the inner absorption element, and (C) a loaded mode where the pressure between the inner absorption element and outer absorption element is less than the pressure with the inner absorption element.

In FIG. 8A, there is no deformation; and the internal pressure at this section is the initial set pressure. Upon an increase in the pressure of the first fluid 56 (as represented by the radially oriented arrows in FIG. 8B), where the first fluid pressure is greater than the second fluid pressure, the circular inner absorption element 176 deforms. In this case, the type of deformation is the wall thickness of the circular inner absorption element 176 increases and the outer diameter decreases. The strength of the circular shape (e.g., having no flat walls to collapse) will generally permit the tube to shrink through an increase in wall thickness, such that volume of the first chamber 72 decreases in this portion of the tube, although collapse is still possible. Looking at FIG. 8C, upon an increase in the pressure of the first fluid 56 (as represented by the radially oriented arrows in FIG. 8C), where the second fluid pressure is greater than the first fluid pressure, the circular inner absorption element 176 deforms. In this case, the type of deformation is the wall thickness of the circular inner absorption element 176 decreases as the outer diameter increases. Whether the circular inner absorption element 176 is forced to decrease in diameter or increase in diameter, depends on the material properties of each of the outer absorption element 177 and the circular inner absorption element 176, the types of fluids within each element and their initial pressures, the type of impact, and so on. The impact absorbers of FIGS. 8B and 8C may have the same or differing physical properties.

Impact energy is absorbed by deforming the outer absorption element 52 and, optionally, the circular inner absorption element 176 by an impact force, and moving the fluids laterally (i.e., in the longitudinal direction), and by other transformation of energy to other forms (e.g., heat, sound, etc.). Thus, assuming the impact absorber 50 is elongated or even circular, an impact in one section will cause deformation in one or more sections opposite of or apart from the impacted section.

Figure 8B:
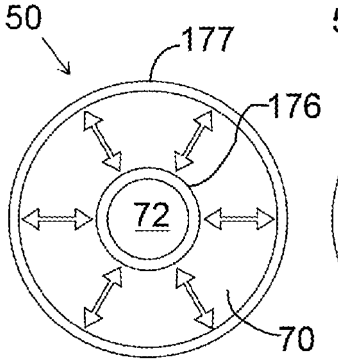
Figure 8C:
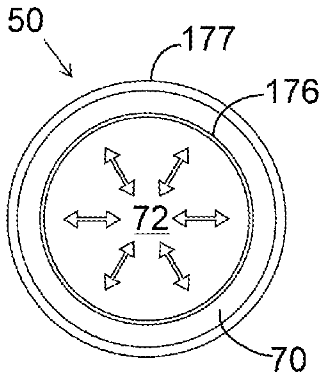
Figure 9A:
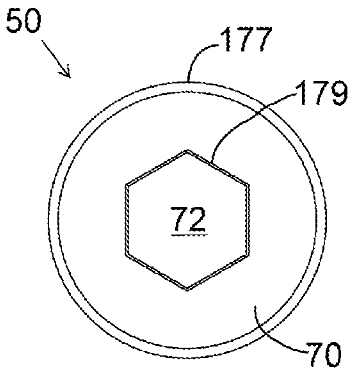
FIGS. 9A-C are schematic cross-sectional views of an exemplary impact absorber, illustrating a hexagonal cross-sectional shaped inner absorption element, illustrated in (A) an unloaded mode, (B) a loaded mode where the pressure between the inner absorption element and outer absorption element is greater than the pressure with the inner absorption element, and (C) a loaded mode where the pressure between the inner absorption element and outer absorption element is less than the pressure with the inner absorption element.
Figure 9B:
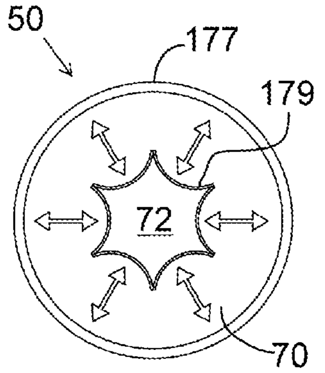
Figure 9C:
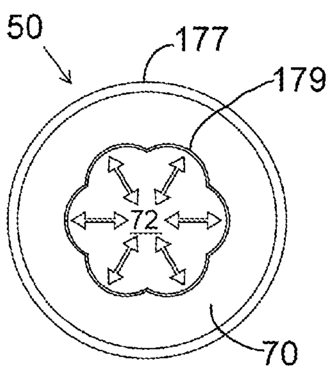

The embodiments of FIGS. 9A-C are constructed much like the embodiment of FIGS. 8A-C, with the outer absorption element 179, except the inner absorption element 178 is hexagonal (or polygonal), which changes the deformation properties of the inner absorption element 178 compared to the circular inner absorption element 176. In FIG. 9B, the flat faces of the hexagonal tube of the hexagonal inner absorption element 178 deform by bending inwardly due to the additional pressure application of the first fluid 56, where the first fluid pressure is greater than the second fluid pressure. In FIG. 9C, the flat faces of the hexagonal tube of the hexagonal inner absorption element 178 deform by bending outwardly due to the additional pressure application of the second fluid 58, where the second fluid pressure is greater than the first fluid pressure.

Figure 10A:
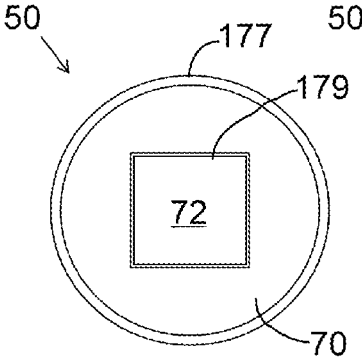
FIGS. 10A-C are schematic cross-sectional views of an exemplary impact absorber, illustrating a square cross-sectional shaped inner absorption element, illustrated in (A) an unloaded mode, (B) a loaded mode where the pressure between the inner absorption element and outer absorption element is greater than the pressure with the inner absorption element, and (C) a loaded mode where the pressure between the inner absorption element and outer absorption element is less than the pressure with the inner absorption element.
Figure 10B:
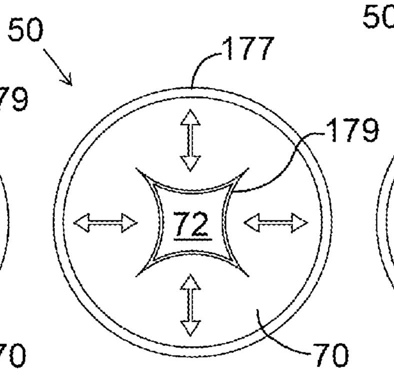
Figure 10C:
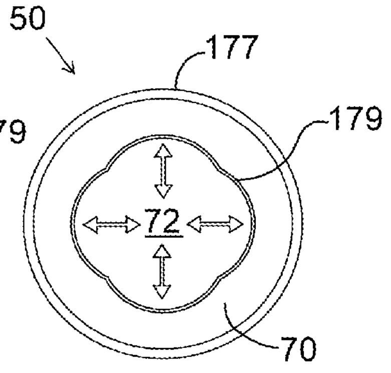

The embodiments of FIGS. 10A-C are constructed much like the embodiment of FIGS. 8A-C, with the outer absorption element 181, except the inner absorption element 180 is rectangular, which changes the deformation properties of the inner absorption element 180 compared to the circular inner absorption element 176. In FIG. 10B, the flat faces of the rectangular tube of the rectangular inner absorption element 180 deform by bending inwardly due to the additional pressure application of the first fluid 56, where the first fluid pressure is greater than the second fluid pressure. In FIG. 100, the flat faces of the rectangular tube of the rectangular inner absorption element 180 deform by bending outwardly due to the additional pressure application of the second fluid 58, where the second fluid pressure is greater than the first fluid pressure.

Figure 11A:
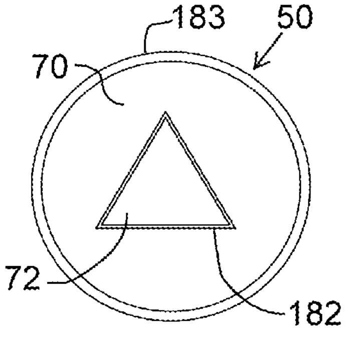
FIGS. 11A-C are schematic cross-sectional views of an exemplary impact absorber, illustrating a triangular cross-sectional shaped inner absorption element, illustrated in (A) an unloaded mode, (B) a loaded mode where the pressure between the inner absorption element and outer absorption element is greater than the pressure with the inner absorption element, and (C) a loaded mode where the pressure between the inner absorption element and outer absorption element is less than the pressure with the inner absorption element.
Figure 11B:
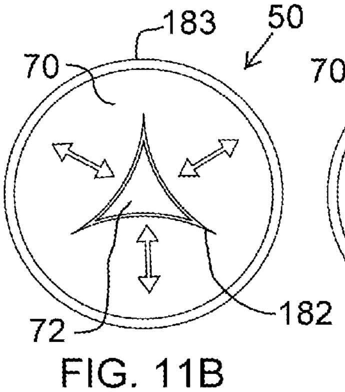
Figure 11C:
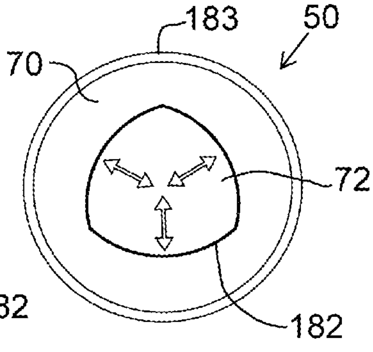

The embodiments of FIGS. 11A-C are constructed much like the embodiment of FIGS. 8A-C, except the inner absorption element 182 is triangular, which changes the deformation properties of the inner absorption element 182 compared to the circular inner absorption element 176. In FIG. 11B, the flat faces of the triangular tube of the triangular inner absorption element 182 deform by bending inwardly due to the additional pressure application of the first fluid 56, where the first fluid pressure is greater than the second fluid pressure. In FIG. 11C, the flat faces of the triangular tube of the triangular inner absorption element 182 deform by bending outwardly due to the additional pressure application of the second fluid 58, where the second fluid pressure is greater than the first fluid pressure.

Turning now to FIGS. 12-18 (some of which are shown without the primary element for ease of understanding) an inner absorption element assembly 54 for insertion into a helmet shell is illustrated, having a first inner absorption element panel 184, a second inner absorption element panel 186, and a third inner absorption element panel 188, aligned (or misaligned) and stacked one on top the other, similar to the inner absorption element assembly of FIGS. 3 and 4 when viewed in cross-section. Although, the inner absorption element panels 184, 186, 188 can be made as an integral assembly (e.g., molded together), they are instead, in the present example, individually molded (e.g., through blow molding or other appropriate manufacturing processes) from a resilient material (e.g., a thermoplastic, a composite material, or other materials known or to be discovered) that is able to be deformed and quickly return to its original or near original shape with little or no permanent deformation, with the ability to survive numerous impact and deformation cycles without substantial permanent deformation due to fatigue (e.g., more than 100 cycles, or more than 500 cycles, or more than 1000 cycles, or more than 5,000 cycles, or more than 10,000 cycles).

Although each of the inner absorption element panels 184, 186, 188 are generally similarly shaped, the exact shape and size of individual panels may vary from layer to layer according to design requirements and limitations. For example, there may be insufficient space within certain regions for all three layers between the protected object PO and the impacted object IO; and thus, one or more layers may be eliminated at that region. In another example scenario, there may be a reduced incident of impact in certain regions, where multiple layers are not required, and are reduced, saving space, weight, and expense.

As described above, the wall thickness of each inner absorption element panels 204, 186, 188 can be varied. In one example, the thicker wall of the first inner absorption element panel 204, closest to the impacted object IO, provides greatest resistance to deformation so that the brunt of the impact force F1 does not immediately crush the first inner absorption element panel 184 (of course, a large enough force will cause the panel to completely collapse in at least one region). Instead, the wall of the first inner absorption element panel 184 deforms partially and transmits at least some of the impact force there through to the second inner absorption element panel 186 with a comparatively thinner wall thickness. The innermost third inner absorption element panel 188 (closest to the protected object PO) has the thinnest wall thickness, as there is less of the impact force F1 to absorb compared to the outer layers and comfort and/or delicate contact on the protect object is generally desired. In yet other example embodiments, the relative thicknesses of the inner absorption element panels 184, 186, 188 may be reversed (i.e., the thinner layer nearest the protected object PO), or arranged in any order, or all layers may be the same thickness.

Looking at the construction of the first inner absorption element panel 184, which is, in at least one embodiment, representative of the remaining inner absorption element panels 186, 188, exactly or at least in terms of the general basic structure. The example embodiment of the inner absorption element assembly 54, in use, would be positioned within and hermetically sealed within an outer absorption element 52 (as similarly illustrated in FIGS. 3 and 4). Instead of the inner absorption element having an open chamber (such as is illustrated in FIGS. 1 and 2) at least one baffle structure (and preferably a plurality or multiplicity) is formed to divide the chamber of the inner absorption element into multiple, fluidly connected sub-chambers. In one or more embodiments, one or more of the sub-chambers are fluidly isolated from the remaining sub-chambers.

Figure 12:
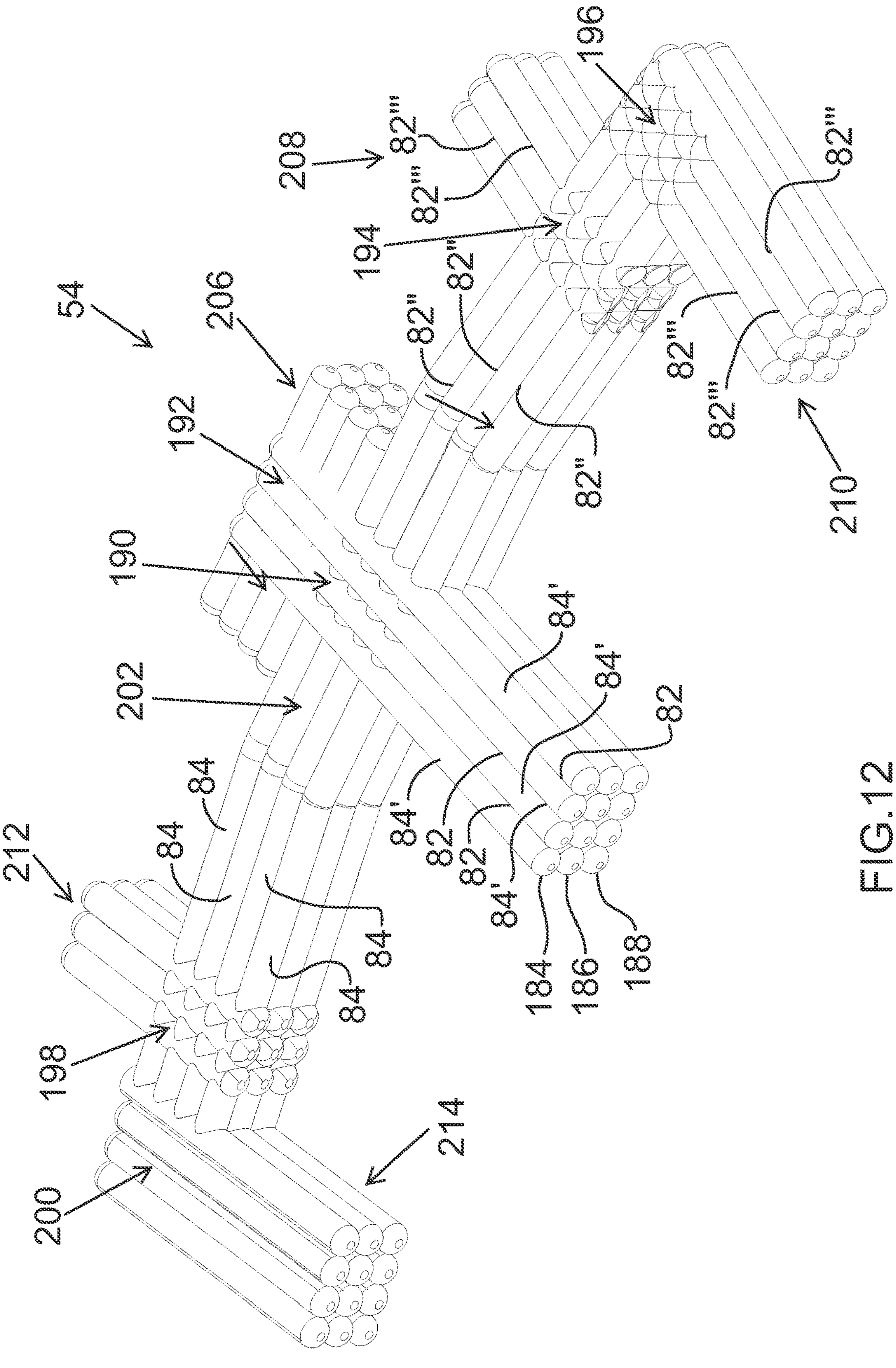
FIG. 12 is a top perspective view of an exemplary inner absorption element assembly, illustrating three inner absorption element panels stack one atop the other.

As illustrated in FIG. 12, the first inner absorption element panel 184 includes a common impact zone 202 (which is additionally referred to herein as the base structure 202) which serves as a base structure from which other structures branch. The base structure 202 is created, as discussed above in reference to FIGS. 2 and 3, by dividing the with a plurality of elongated seams 82, running generally lengthwise and parallel, between which are formed a plurality elongated chambers 84. The plurality elongated chambers 84 create separate fluid paths, where the fluid within each elongated chamber 84 can comingle and equalize pressures within one or more manifold regions 190, 192, 194, 196, 198, 200. The manifold regions 190, 192, 194, 196, 198, 200 can be created by ending or pausing the run of one or more elongated seams 82 between the elongated chambers 84 (e.g., by not fully pinching off or welding the seams at certain portions), such that fluid may cross from one elongated chamber 84 to the next.

The purpose of the elongated chambers is to permit the quick and controlled flow of fluid from the impacted (and thus compressed and/or reduced in volume) portion to other non-compressed portion. This allows the fluids in the primary and interior chambers to isotropically diffuse throughout the both chambers instantly spreading the incoming kinetic energy into a very large surface absorbing area. The fluid may simply flow through some portions or expand the portions of the elongated chambers 84 due to the localized temporary increase in pressure of the impacted region and or the mechanical pumping of fluid (e.g., as the impact deforms and pinches the elements, the fluid may also be pumped peristaltically) through the duration of the impact, which may be on the order of milliseconds. To prevent one elongated chamber 84 from be overstressed, the fluid pressure permitted to equalize in the manifold regions 190, 192, 194, 196, 198, 200. In one or more embodiments, there is a single manifold region, or multiple manifold regions, or the manifold regions may be eliminated.

Keeping in mind that the inner absorption element panels 204, 186, 188 are contained within the outer absorption element 52 and are completely surrounded or surrounded in-part by the first fluid 56, the degree and type of deformation of the inner absorption element panels 204, 186, 188 and the outer absorption element 52 are interrelated by the selection of various design factors (e.g., the cross-sectional geometry, chamber volumes, wall thickness, wall material, the resultant volume between the inner absorption element assembly 54 and the outer absorption element 52 (e.g., the free space through which the inner absorption elements are permitted to expand), the pressure of the first fluid 56, the pressure of the second fluid 55, the pressure of the third fluid 60, the pressure of the fourth fluid 80, and other design factors which affect deformation and fluid flow).

Still looking at the first inner absorption element panel 184 as an example, in one or more embodiments, the base structure 202 can optionally include one or more extended impact zones 204, 206, 208, 210, 212, 214 (which may also be referred to herein as panel branches) branching from the base structure 202 or other structure. Each of these panel branches 204, 206, 208, 210, 212, 214 extend transversely from the base structure and include a plurality of elongated seams 82' that define two or more elongated chambers 84' which are configured to intersect the elongated chambers 84 of the base structure 202.

Looking at the function of the various regions of the first inner absorption element panel 184 (and the other panels), this example configuration is designed to be fitted within a helmet shell for head protection. When fitted within an American football helmet shell and worn on the user's head (where the entire inner absorption element assembly 54 is positioned within the outer absorption element 52 and the impact absorber is pushed into conforming with the curve of the inner side of the helmet shell, and fixed in position by fasteners, such as hook and loop, snaps, and the like), the base structure 202 wraps about the circumference of the head (either covering the full circumference or much of the circumference); panel branch 204 extends up the back of the head toward the crown of the head; panel branch 206 traverses panel branch 204 and runs parallel and adjacent to the base structure 202 and is configured to cover the base of the skull; panel branch 208 extends downwardly from the base structure 202 to cover the side of the skull just forward the ear; panel branch 212 extends downwardly from the base structure 202 to cover the side of the skull just forward the opposite ear; and panel branches 210 and 214 meet at the front of the skull on either side of the front of the skull and extend toward the crown. It should be noted that the present impact absorber 50 does not need to cover the entire head, but could be designed to do so in one or more example embodiments.

At the point where each of the panel branches 204, 206, 208, 210, 212, 214 intersects either the base structure 202 or another panel branch, a manifold region 190, 192, 194, 196, 198, 200 is formed. One or more these intersections can be formed without the manifold regions 190, 192, 194, 196, 198, 200, in one or more example embodiments. The manifold region 190, 192, 194, 196, 198, 200 permit the quick transfer of fluid from any one of the braches or from the base structure 202 to other portions of the base structure 202 and/or the panel branches 204, 206, 208, 210, 212, 214. Thus, during an impact, fluid can move from a reduced volume area (reduced due to a localized impact) to all other areas.

Due to fluid laterally moving away from the impact area through the elongated chambers 84 and the primary chamber 70, the first fluid 56 within the primary chamber 70 expands the volume of the primary chamber 70 in areas outside the impact area and/or the second fluid 58 within the first chamber 72 expands the volume of the first chamber 72 in areas outside the impact area. Alternatively, the volume expansion of the primary chamber 70 and the accompanying increase in pressure of the first fluid 56 (because, in one or more embodiments, expansion of the outer absorption element 52 can be purposefully made insufficient to permit a drop in pressure compared to the preset pressure) surrounding the inner absorption element panels 184, 186, 188 will exert a great force on the elongated chambers 84 from all directions normal to the round tubular walls of the elongated chambers 84. Thus, because the first fluid 56 is pushing equally from all directions, the wall thickness of the elongated chambers 84 of the inner absorption element panels 184, 186, 188 will increase, which can decrease the volume of the elongated chambers 84 in the areas of wall thickening.

As soon as the impact event ends, the fluids 56, 58, 60, 80 rush laterally through the respective chambers of the impact absorber 50, back toward the recent impact area, being pushed back due to the deformed areas elastically returning to the original shapes (e.g., the expanded portions of the outer absorption element 52 and, optionally, the inner absorption elements will mechanically squeeze the fluids, causing movement to quickly back fill the fluid pushed out of the impact zone and the wall thicknesses returning to the original thickness). Basically, the impact absorber 50 is biased to quickly return to a state of equalized pressure, as soon as an impact ends, by all components quickly returning to their original shape. This rebound occurs quickly, so that the present impact absorber 50 resets and returns to the original shape within milliseconds after an impact, so that another successive impact can be likewise absorbed.

Figure 13:
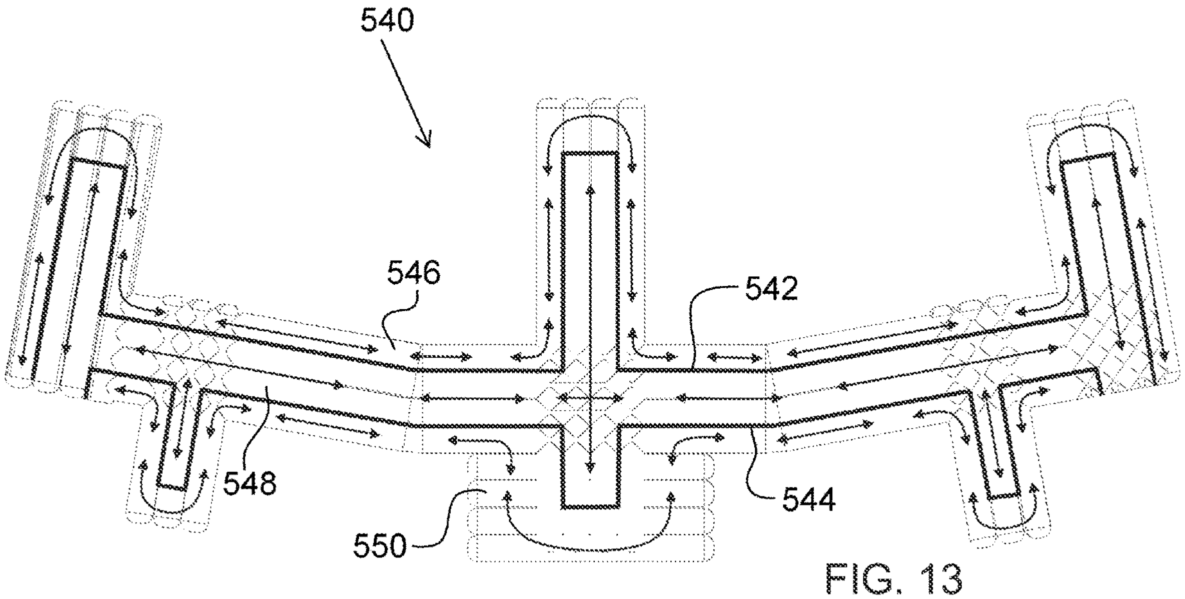
FIG. 13 is a top plan view of one of the inner absorption elements of FIG. 12, illustrating a division of the inner absorption element into three chambers.

Looking at FIG. 13, in one or more embodiments, one or more of the inner absorption element panels 540 of the embodiment of FIG. 12 can be further divided by one or more seams into multiple isolated regions. Seam 542 and seam 544 (created by a pinching off process or the like) define a first isolated portion 546, a second isolated portion 548, and a third isolated portion 550, each of which may have the same or differing fluid pressures. The arrows within each isolated portion indicate that the fluids hermetically contained within each isolated portion can flow throughout the respective isolated portions (through the elongated chambers and manifold regions). The fluids within each isolated portion 546, 548, 550 can be the same or a different fluid. This arrangement permits targeted impact absorption, based on the impact type and magnitude expected to be experienced within each region.

Figure 14:
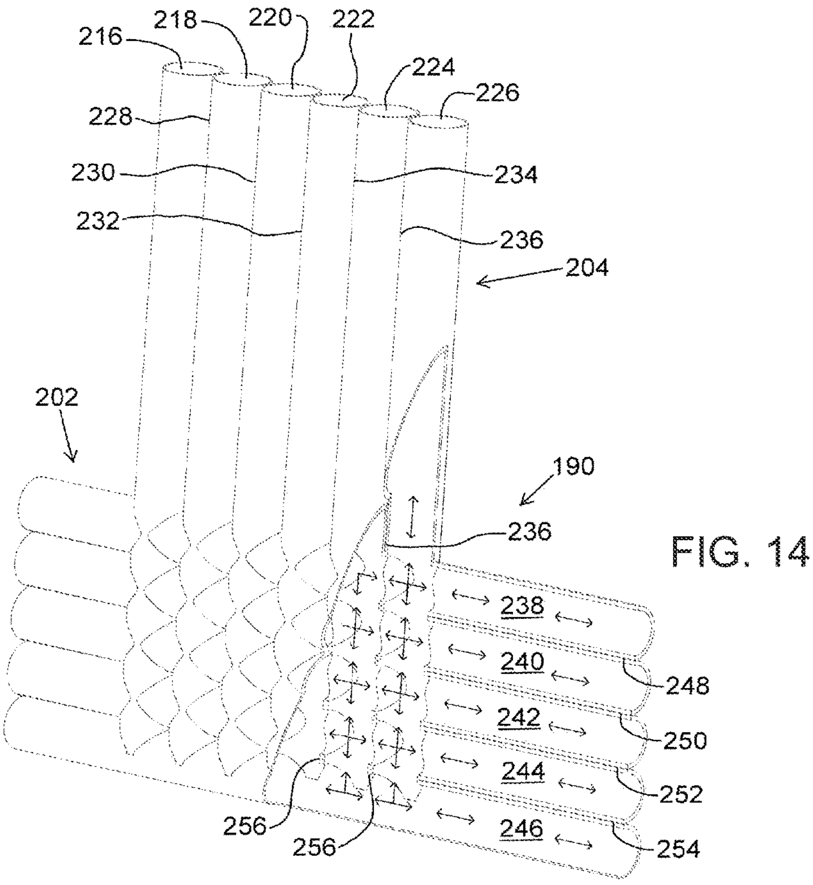
FIG. 14 is a magnified perspective partial cross-sectional view of one inner absorption element panel as shown in FIGS. 12 and 13, illustrating the manifold region.

FIG. 14 is a magnified cross-sectional view of the manifold region 190 at the intersection of the base structure 202 and panel branch 204 of the first inner absorption element panel 184. It can be seen that the elongated chambers 84 of the base structure 202 intersect the elongated chambers 84' of the base structure 202. The elongated seams 82 of the base structure 202 and the elongated seams 82' of the panel branch 204 include breaks in the seams 82, 82', so that when one elongated chamber intersects another elongated chamber, at the point of intersection, the channels open to one another, so that the fluid can move through each channel unhindered and move between the base structure 202 and the panel branch 204 (as indicated by the crossed arrows). In this way, fluid is quickly moved throughout the first inner absorption element panel 184 and is readily exchanged between the panel branches 204, 206, 208, 210, 212, 214 and the base structure 202, through the various manifold regions 190, 192, 194, 196, 198, 200. Cones 256 within the manifold region 190 connect the plies of material that comprise the first inner absorption element panel 184 to control deformation in the manifold region 190, and are created using known pinch off techniques in blow molding.

Figure 15:
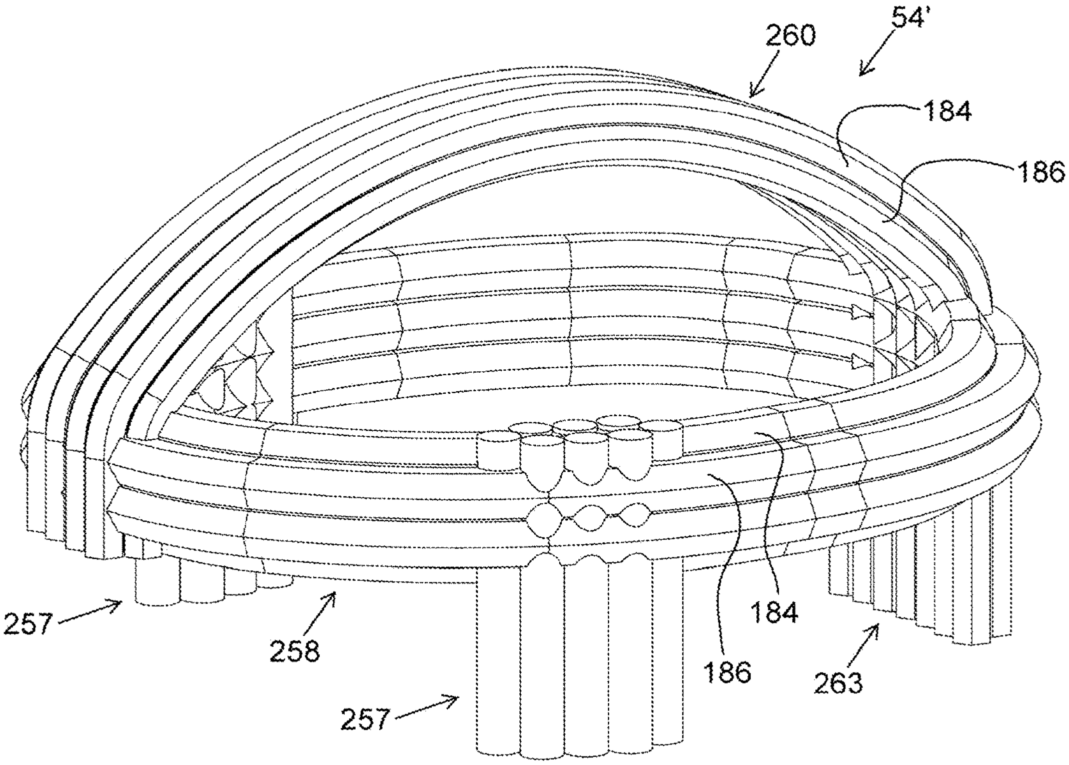
FIG. 15 is a top perspective view of an alternate inner absorption element assembly including a crown portion with absorption tubes with different profile shapes, tailored for specific impact loads, ready for insertion into a helmet.

FIG. 15 illustrates an embodiment of the inner absorption element assembly 54, where the first inner absorption element panel 184, the second inner absorption element panel 186, and the third inner absorption element panel 188 are each made with an annular portion 258 and a crown portion 260 arcing from one side of the annular portion 258 to the opposite side, fluidly and mechanically connecting through manifold regions 259, 261. The cheek pads 257 and lower neck absorbers 263 are integral chambers molded into the main feed chambers 186 and 184 and help share the incoming impact loads. The inner absorption element panels 184, 186, 188 are nested one within the other, and are not fluidly connected (e.g., the second fluid 58 does not comingle with the third fluid, unless they are selectively fluidly connected). An outer absorption element 52 surrounds the inner absorption element assembly 54, as discussed above.

Figure 16:
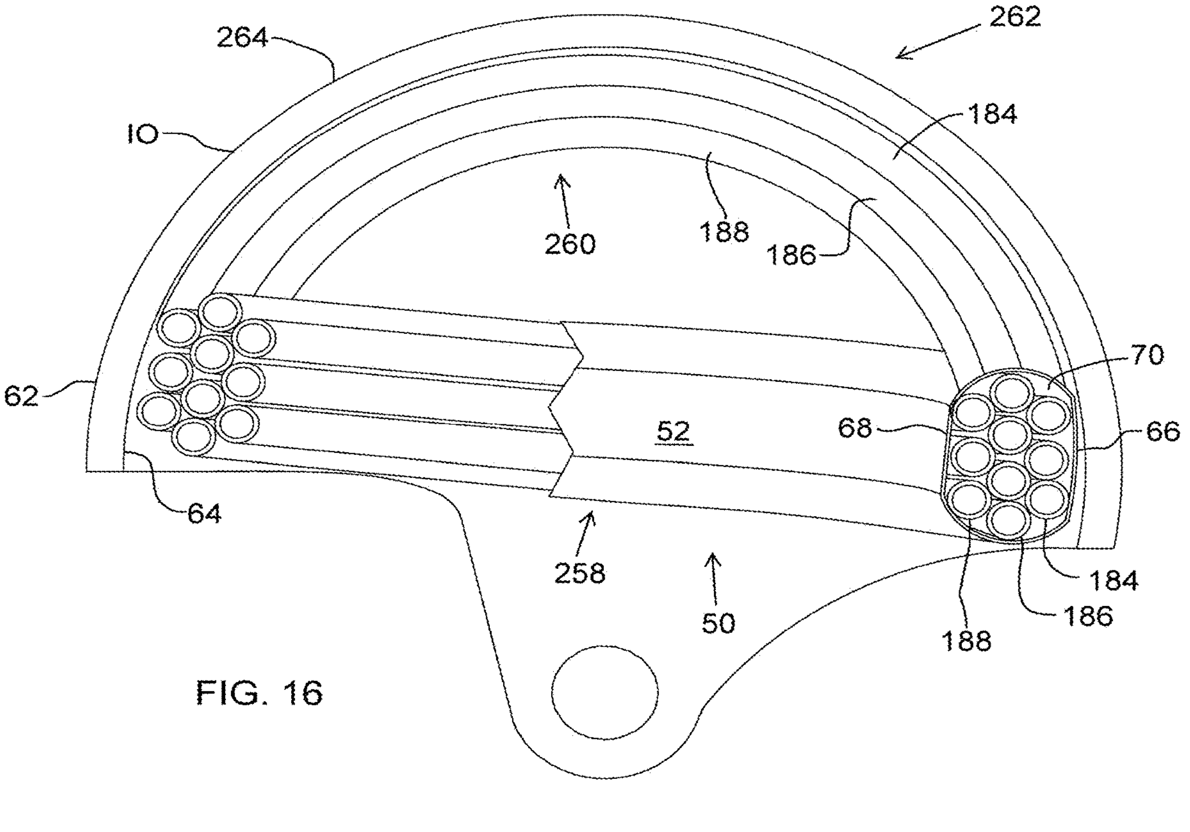
FIG. 16 is a cross-sectional side view of the inner absorption element assembly of FIG. 15 inserted within a helmet, with portions of the outer absorption element removed for clarity.

FIG. 16 illustrates a helmet assembly 262, with the present impact absorber 50 fitted within a standard football helmet 261 (or any of a wide variety of similar helmets). The impact absorber 50 embodied in FIGS. 12-15 and other various embodiments are readily fitted within the helmet 261. The inner absorption element assembly 54 is similar in construction to the embodiment of FIG. 15, with the annular portion 258 and the crown portion 260, with the assembly 54 being hermetically sealed within the outer absorption element 52 and surrounded by the first fluid 56 within primary chamber 70. It should be noted that there is not necessarily a large amount of empty space within the primary chamber 70; and the inner absorption element panels 184, 186, 188 can be closely situated next to or even contacting the outer wall 59 of the outer absorption element 52. It can be seen that the impacted side 66 of the impact absorber 50 is adjacent to the inner surface 64 of the helmet shell 264. The impact absorber 50 embodied in FIGS. 12-15 other various embodiments are readily fitted within the helmet 261. The outer absorption element 52 can be configured as a flexible member, capable of bending and forming to fill the space between the user's head and the inner surface 64. Although the outer absorption element 52 is flexible, it may be substantially inelastic, where the material is designed to substantially not stretch under the stress of normal use and impact. However, elastic stretching to a small degree may be permitted, such as less than a change in a dimension, or as less than a 5% change in a dimension, or less than a 3% change in a dimension, or less than a 1% change in a dimension.

FIG. 17 illustrates the impact absorber 50 illustrated within the football helmet 261 of FIG. 16, with a transverse section taken across the head H, through the impact absorber 50, and through the helmet shell 261 (drawn schematically as a single line). A glancing force F2 strikes the helmet shell 261 region atop the extended impact zone 210 (referring back to FIG. 13) a distance offset from the approximate axis of rotation (about the wearer's vertebrae). The glancing force F2 rotates the helmet shell 261 relative to the head H. The goal of the present impact absorber 50, is to absorb the force and prevent excessive acceleration of the head H, in this case, both angular and linear acceleration.

Looking only at the angular (rotational) acceleration, the helmet 261 is rotated through the angle θ in response to F2. To absorb much of the energy of the impact, at least a portion of the extended impact zone 210 is compressed. As described above, the first inner absorption element panel 184, the second inner absorption element panel 186, and the third inner absorption element panel 188 can have differing impact absorption properties (e.g., differing pressures, materials, wall thickness, geometries, etc.). In the present example embodiment, the first inner absorption element panel 184 and the second inner absorption element panel 186 can be least compressible, yet absorb much of the initial impact (along with the outer absorption element). While the third inner absorption element panel 188 compresses the most to provide maximum protection to the head H, even though much of the force F2 has been absorbed by panels 184 and 186. Due to the interconnection of the various regions provided by the manifold system optionally integrated within each of the first inner absorption element panel 184, the second inner absorption element panel 186, and the third inner absorption element panel 188, the fluid within each panel are forced by compression, within milliseconds, to the remaining portions of the panels not in compression (e.g., away from the region immediately surrounding the point or area of impact of force F2.

In this example embodiment, the outer absorption element 52 surrounds and contains the panels 184, 186, 188, about the head H (annular portion 258, as shown in FIG. 16) and over its crown (crown portion 260, as shown in FIG. 16). The first fluid 56 is contained within the outer absorption element 52 and surrounds the inner absorption elements, which are panels 184, 186, 188 in this example. The outer absorption element 52 is configured not to elastically stretch (e.g., inelastic or substantially inelastic), yet it can bend under stress. The force of the impact F2 will squeeze the outer absorption element 52, in some instances bringing the impacted side 66 closer in proximity to the protected side 68, mechanically squeezing the panels 184, 186, 188 therebetween. Further, due to the deformation of the outer absorption element 52, the pressure of the first fluid 56 will increase compared to the initial set pressure. The pressurized first fluid 56 surrounds and bears upon on the panels 184, 186, 188 (normal to the wall of each portion of the panel), applying a fluid pressure upon the walls of the panels, and thus deforming the panels reducing the inner volume of the panels 184, 186, 188 and/or thickening the walls of the panels 184, 186, 188. Thus, in many impact scenarios, there is a combination of mechanical deformation (through physical squeezing that occurs between the helmet shell 264 and the head H in the impact region) and deformation caused by fluid or hydraulic pressure bearing upon the panels (where the first fluid 56, such as air, is compressed due to the inelastic properties of the outer absorption element 52).

Looking still at the impact illustrated in FIG. 17, the compressed region 266 of the impact absorber 50 is reduced in volume, in each of the panels 184, 186, 188 and the outer absorption element 52, because a portion of each of the fluids 56, 58, 60, 81 are squeezed out of the compressed region 166, the fluids 56, 58, 60, 81 must travel to the less compressed and lower pressure regions to equalize the fluid pressures. The fluids 56, 58, 60, 81 will at least partially expand regions of the impact absorber 50, and can have a region of maximum expansion, such as expanded region 288, where the shift (rotation in this example) of the helmet shell relative to the head will create space for expansion in one or more regions situated away from the point of impact. In FIG. 17, the impact force F2 is applied to the left side of the helmet shell 264 and forward the axis of rotation A, which causes the helmet to rotate over the angle θ. Opposite the compressed region 266, is the expanded region 288, expanding within the gap created by the helmet shell 264 rotating while the head H remains substantially stationary for at least the first milliseconds of the impact. The panels 184, 186, 188 expand to fill this gap, each expanding to varying degrees or to the same degree.

During an impact, the fluids 56, 58, 60, 81 are forced about the impact absorber 50 through the tube-like channels of the panels 184, 186, 188 and through the outer absorption element 52, absorbing energy through the mechanical pumping of the fluids 56, 58, 60, 81, through the mechanical deformation of the impact absorber 50, through the hydraulic deformation of the panels 184, 186, 188 (by compression or expansion), and the other form of energy absorption within the impact absorber 50. Further, because all gaps created in an impact are filled almost immediately by expansion, the head H is substantially prevented from moving with the helmet, initially, and striking the side of the helmet opposite the point of impact.

Once the impact force F2 is removed (or at least the large impulse is complete), the helmet shell is biased by the impact absorber 50 to return to its initial position relative to the head H, in this example, returning back over the angle θ.

Thus, the present impact absorber is self-centering, in that it returns to its original or substantially original position. The bias is due to the deformed portions of the impact absorber 50 being elastically biased to return their original shape. Thus, the expanded region 288 and the compressed region 266 will work together to equalize their pressures and force the fluids 56, 58, 60, 81 from the expanded region 288 back to the compressed region, which happens within milliseconds after the impact. This means the present impact absorber 50 can absorb a first impact and return to its original shape before a second impact strikes the helmet. In American football, in a single tackle event, the helmet might be impacted by several forces in quick succession; for example, one player's helmet striking another players helmet creates a first impact; and the player's helmet striking the ground immediately afterwards creates a second impact. Because the impact absorber 50 rebounds quickly to its original or substantially original shape (e.g., within 60% to 90% the original shape) between the time of the two impacts, the impact absorber 50 is reset and ready to absorb the second impact.

Figure 19:
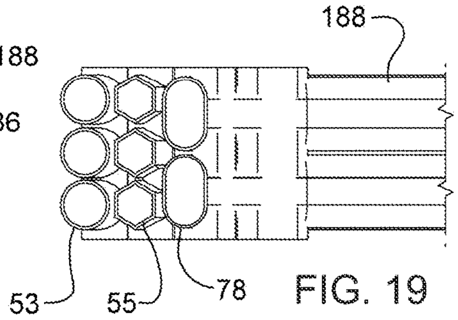
FIG. 19 is a side cross-sectional view of the embodiment of FIG. 18, showing the cross-sectional shapes of the inner absorption elements.
Figure 18:
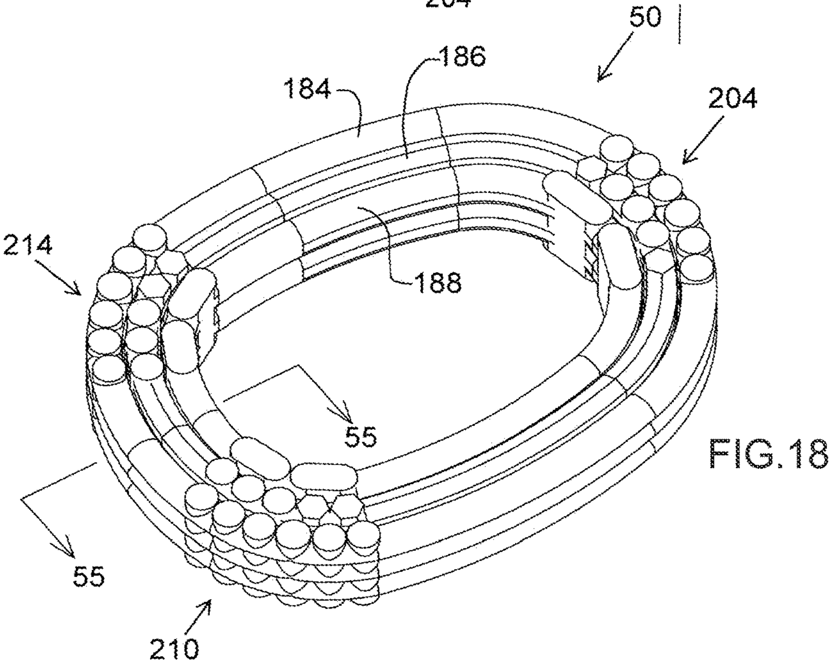
FIG. 18 is a cross sectional top perspective view of an alternate inner absorption element, ready for insertion into a helmet.

FIGS. 18 and 19 illustrate an embodiment similar to the embodiments of FIGS. 16 and 17, except, instead of only circular cross-section inner absorption elements, the inner absorption elements 53, 55, and 78 are a combination of cross-sections. The outer absorption element 52 is not shown for clarity, but would be included in one or more embodiments, or optionally excluded. For example, each tube of the first inner absorption element 53 is a circular cross-section. Tubes of circular cross-section are generally relatively difficult to compress, and, in one or more embodiments, is positioned nearest or near in proximity to the impacted object, bearing the brunt of the impact force. The second inner absorption element 55 is positioned inwardly from and next to the first inner absorption element 53. Each tube of the second inner absorption element 55 has a hexagonal cross-section, which is generally relatively easier to compress and deform than the circular cross-section. The third inner absorption element is positioned most inwardly (e.g., next to the wearer's head in the helmet embodiment). Each tube of the third inner absorption element 78 has an oblong oval cross-sectional shape (e.g., an obround shape in this illustrated example), which is relatively, generally easiest to compress, providing pliability and comfort against the wearer's head or delicate protection for the protected object.

Much like the embodiment of FIG. 17, although the extended impact zones 204, 210, and 214 are shown as being cut to illustrate the cross-sectional shapes, they each extend over the crown of the wearer's head (in the helmet embodiment). In one or more embodiments, each of the extended impact zones 204, 210, and 214 branch in an arc, and either join at some point on the crown (like a Y-shape or similar) or terminate without joining. Sections 210, 214, and 204 are perpendicular to the lateral rings. These areas can have different shapes, specifically tuned, to absorb the rotational impacts from off-centered impacts now considered to a major factor in concussions.

Figure 20:
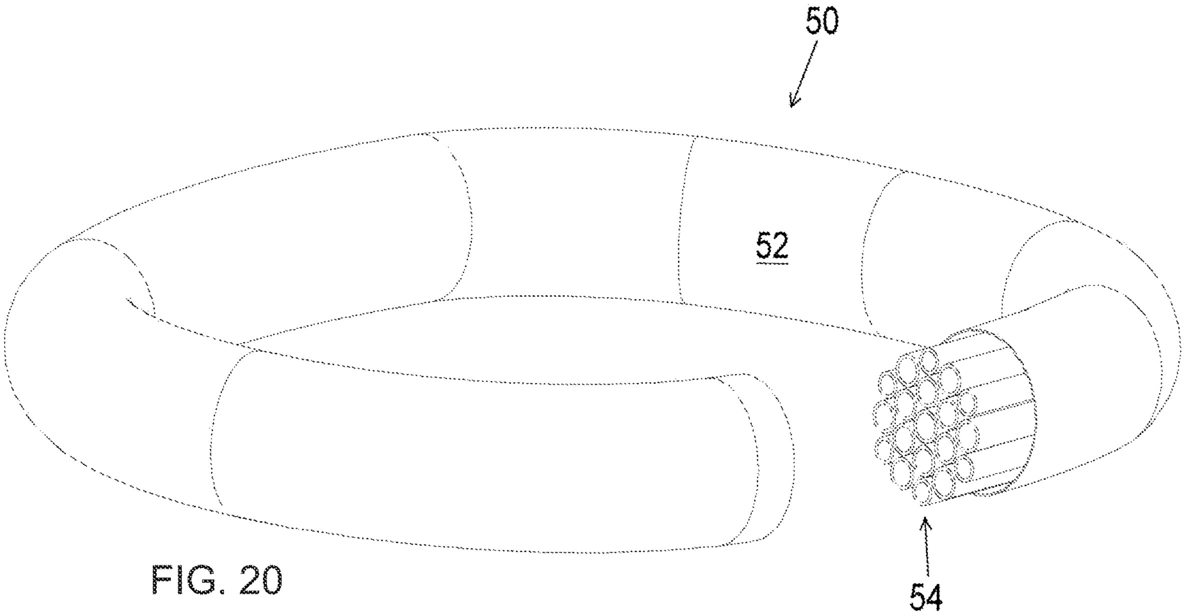
FIG. 20 is a top perspective view of an alternate inner absorption element assembly, ready for insertion into a helmet.
Figure 21:
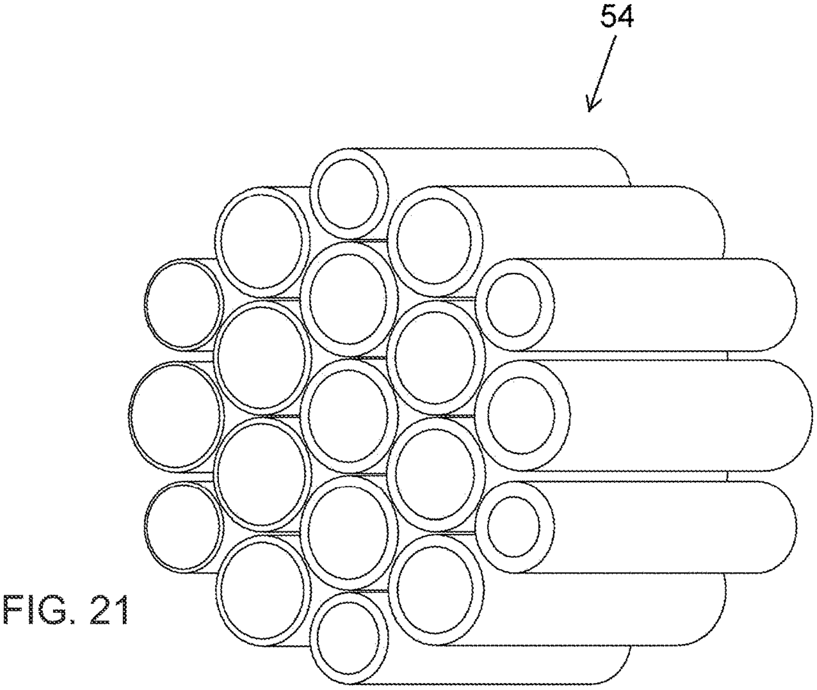
FIG. 21 is a perspective magnified view of the inner absorption element assembly of FIG. 20.

Yet another example embodiment of the present impact absorber 50 is illustrated in FIGS. 20 and 21. The impact absorber 50 is formed as a loop, with the outer absorption element 52 surrounding the inner absorption element assembly 54, configured as a bundle of inner absorption elements. Although the loop is illustrated as being opened (or C-shaped), it forms a complete loop in at least one embodiment, such that there is no break in the fluid flow about the loop. Alternatively, the inner absorption elements are tubular elements (or other cross-sectional shapes as shown in FIGS. 9-11 or other shapes appropriate for the application), sealed at each end and contained within the outer absorption element 52. FIG. 19 shows a section of the inner absorption element assembly 54, illustrating that each of the inner absorption elements can vary in diameter and wall thickness, with the outermost (rightmost) inner absorption elements having the greatest wall thickness and the innermost inner absorption elements (leftmost and closest to the head) having the least wall thickness.

FIGS. 22, 23, and 24A-H illustrate yet an embodiment where opposing and nested (e.g., intermeshing, interlocking with generally a space therebetween, or aligned such that intermeshing or interlocking occurs under sufficient load) corrugation-like structures (where at least some of the example corrugations have a isosceles trapezoid cross-sectional shape and others may be a hybrid of this shape and a curvilinear shape) absorbs and dissipates both normal and shear components of the impact force to prevent substantial damage to the protected object there behind. Looking first at FIGS. 22 and 23, this example embodiment of the present impact absorber 50 generally includes a first ply of sheet material 396 ultimately sealed about the common perimeter to a sixth ply of sheet material 406 to define the outer absorption element elements 384 and 385, with primary chambers 390 and 391, respectively, surrounding one or more inner absorption elements. Although the plies of sheet material are numbered in this and other example embodiments, the numbering for each sheet may change or be rearranged herein, depending on the number of sheets within an assembly and other obvious changes in naming convention.

Using one example method of manufacture and assembly, a first ply of sheet material 396 and a second corrugated ply of sheet material 398 are sealed together about the common perimeter at seam 430 to define a primary chamber 390 there between, which creates the first sub-assembly 408, where, optionally, each sub-assembly of the impact absorber 50 can be made separately by blow molding (or other known process, and as described elsewhere herein), and assembled finally into the complete impact absorber 50.

Next, the second corrugated ply of sheet material 398 and a third corrugated ply of sheet material 400 are sealed together about the common perimeter at seam 429 (where the seam is created when all sub-assemblies are sealed together) to define a first chamber 392 there between. The corrugations of the second corrugated ply of sheet material 398 and the third corrugated ply of sheet material 400 are nested; for example, such that ridge 416 (of third ply 400) is positioned within trough 420 (of second ply 398) and ridge 418 (of second ply 398) is positioned within trough 422 (of third ply 400) and ridge, with space between the corrugations creating the interstice of first chamber 392.

Then, the third corrugated ply of sheet material 400 and a fourth corrugated ply of sheet material 402 are sealed together about the common perimeter at seam 432 to define a second chamber 394 there between, which creates the second sub-assembly 410. Instead of the corrugations being nested, the corrugations are opposing, such that the crests of the corrugations substantially align, where the crests of the third corrugated ply of sheet material 400 would be capable of contacting the crests of the fourth corrugated ply of sheet material 402 under at least some loads conditions, which is discussed in greater detail below.

The fourth corrugated ply of sheet material 402 and a fifth corrugated ply of sheet material 404 are sealed together about the common perimeter at seam 429 (where the seam is created when all sub-assemblies are sealed together) to define a first chamber 393 there between. The corrugations of the fourth corrugated ply of sheet material 402 and the fifth corrugated ply of sheet material 404 are nested, as described above with the assembly of the second corrugated ply of sheet material 398 and a third corrugated ply of sheet material 400.

The fifth ply of sheet material 404 and the sixth corrugated ply of sheet material 406 are sealed together about the common perimeter at seam 434 to define a primary chamber 391 there between, which creates the third sub-assembly 412. As briefly described above, the first sub-assembly 408, the second sub-assembly 410, and the third sub-assembly 412 are sealed together by sealing the flanges of seal 430 and seal 434 together, trapping the second sub-assembly therebetween by seal 432. Assembling the sub-assemblies 408, 410, 412 creates chambers 392 and 393. Within each of the chambers 390, 391, 392, 393, and 394 a fluid is contained under a preset or user set pressure, as described above in the discussion of the embodiment of FIG. 22.

The first ply of sheet material 396 and the sixth ply of sheet material 406 are each shaped to include elongated parallel ridges 414 (with an arced profile in this example), which when assembled into the impact absorber 50, form protrusions as viewed from the outsides of plies 396 and 406. The ridges 414 acts as a pump, where an impact initially pushes the one or more ridges 414 from the arced shape to a flatter state (flat, concave, or less arced, e.g., a larger radius arc), thus potentially increasing the pressure in at least the primary chamber 390, either by compressing the fluid within the chamber or by transferring the pressure to the neighboring chambers. Although the plies 396 and 406 are formed with corrugation-like, elongated, parallel ridges, other protrusion and/or irregularities in a planar ply of sheet material are possible, such as dimples, domes, and so on.

Between each ridge 414, facing within chambers 390 and 391, are contact surfaces 424 that are configured to contact the crest of ridges of the second corrugated ply of sheet material 398 and the sixth corrugated ply of sheet material 406, respectively. These contact surfaces are generally flat, but may have varying shaped, such as concave, convex, or other shape configured to bear upon an opposing contact surface or other surface for transferring force from one ply to the next. For example, when sufficiently deformed and compressed by the impact force incident on the impacted object adjacent to the first ply of sheet material 396 (where the first ply 396 is adjacent to the impacted object and the sixth ply 406 is adjacent to the protected object, although this may be switched, depending on the design and application), contact surface 424 of the first ply of sheet material 396 bears upon contact surface 426 of the second ply of sheet material 398. As a further example, of the plurality or multiplicity of contact surfaces within the illustrated impact absorber 50, contact surface 432 of the first ply of sheet material 396 bears upon contact surface 430 of the second ply of sheet material 398.

Additionally, the sides or legs of the trapezoidal corrugations can come into contact when compressed with sufficient force and/or pressure (lateral and/or normal forces). For example, instead of the contact surfaces 424 and 426 comprising the short bases of the trapezoidal shape, the contact surface pairs (e.g., surfaces 434 and 436 or surfaces 432 and 438) can be the legs of the trapezoidal shape. Looking at contact surface 434 of the fourth corrugated ply 402 and contact surface 436 of the fifth corrugated ply 404 (each surface the surfaces will contact one another when under sufficient lateral force (e.g., a force with a component not normal to the short base of the trapezoidal corrugations) and/or sufficient normal force (e.g., a force with a component normal to the short base of the trapezoidal corrugations) and/or sufficient pressure is present. The contact surfaces on the legs of the trapezoidal corrugation controls the lateral shift, for example, caused by a glancing blow on a helmet, of the neighboring plies relative to one another due to the mechanical interference cause by two surfaces blocking movement of the associated corrugation; and, thus, controls, slows, reduces or otherwise affects the shift of the various plies of sheet material relative to each other, and, ultimately, the shift of the impacted object relative to the protected object.

Figure 22:
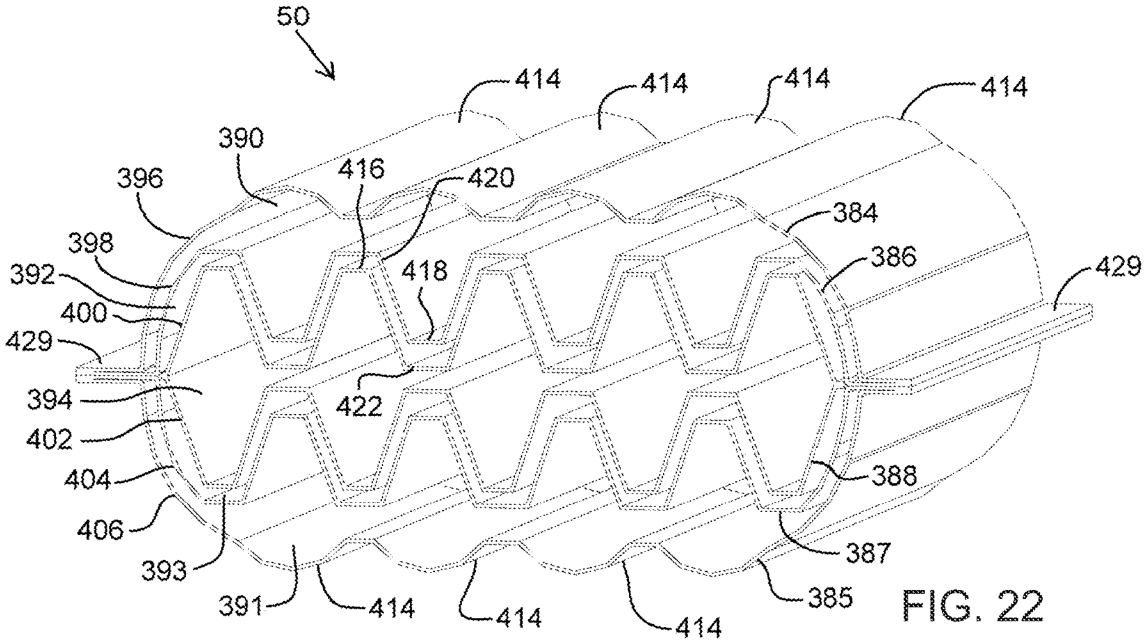
FIG. 22 is a cross-sectional perspective view of an alternate embodiment of the impact absorber.
Figure 23:
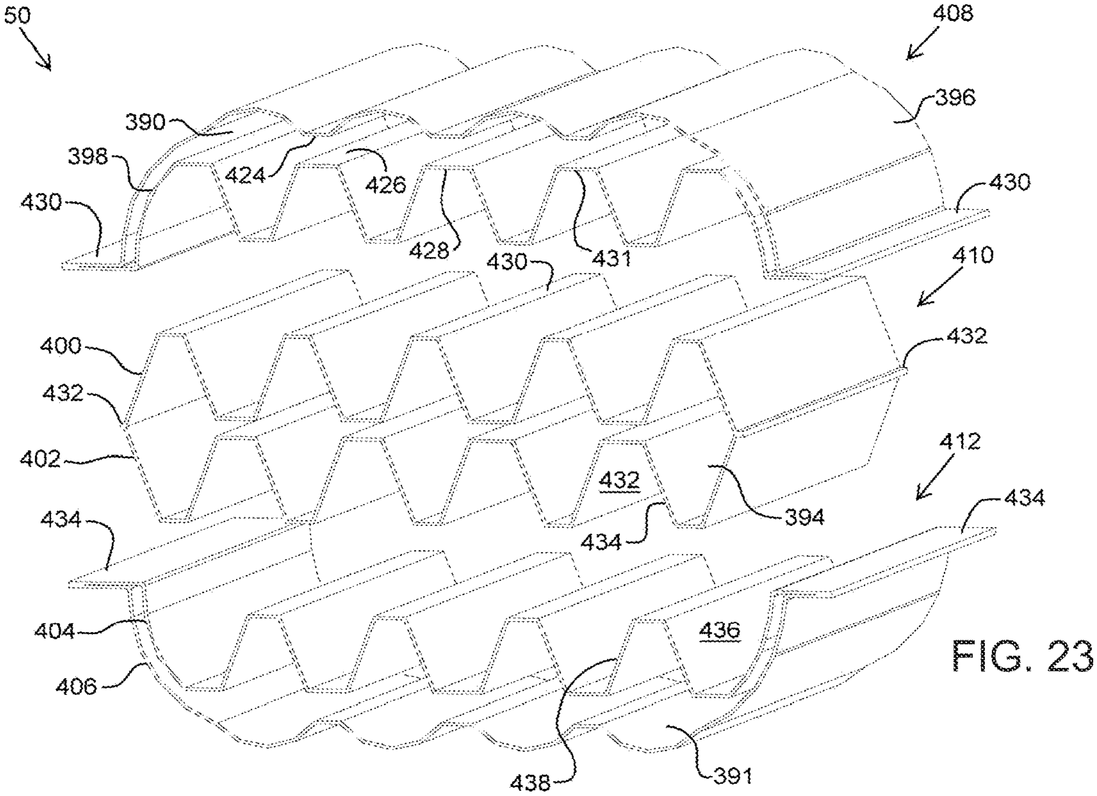
FIG. 23 is a partially exploded cross-sectional perspective view of the embodiment of FIG. 22.
Figure 25:
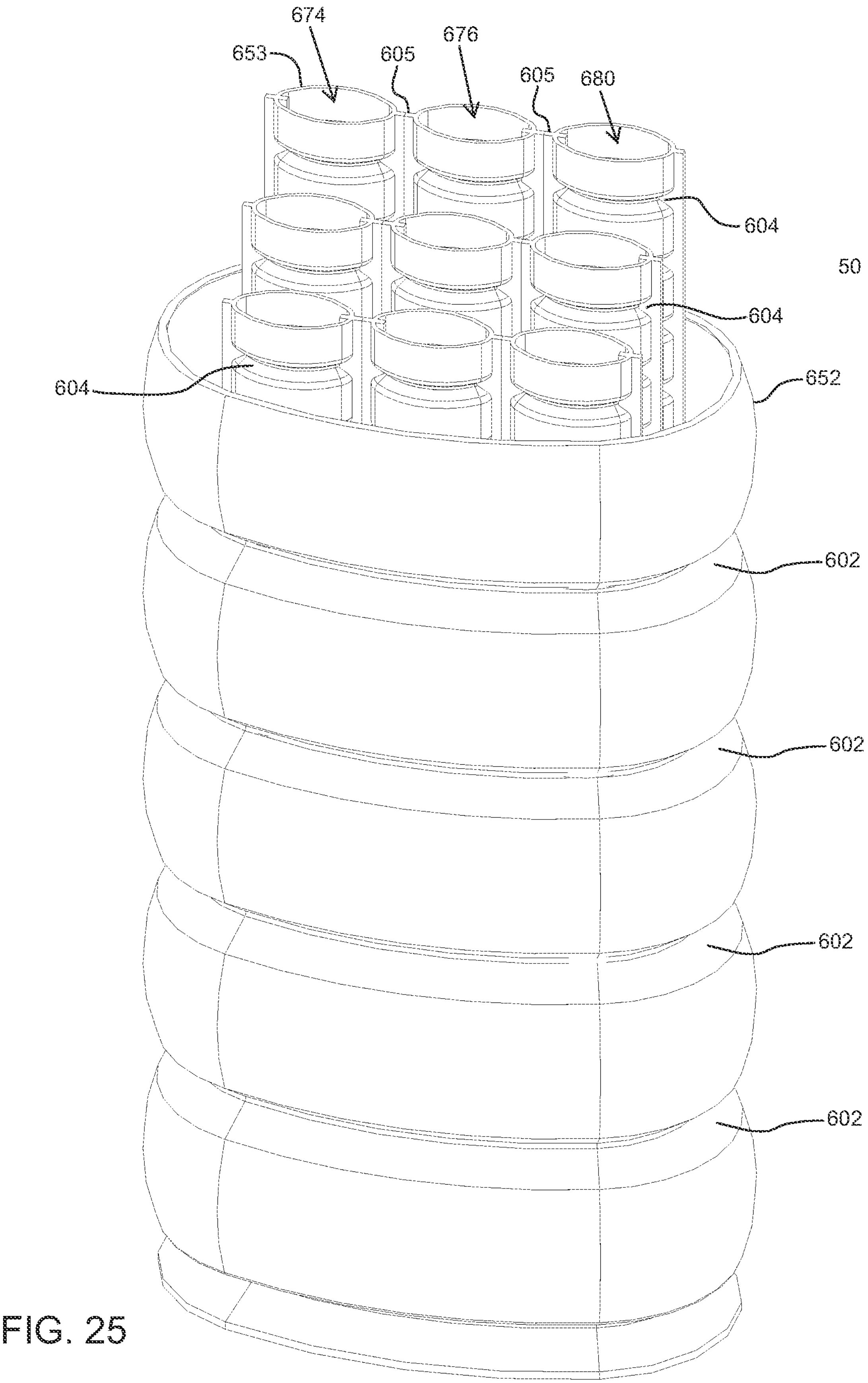
FIG. 25 is a perspective cross-sectional view of another exemplary impact absorber, in accordance with at least one embodiment.
Figure 26A:
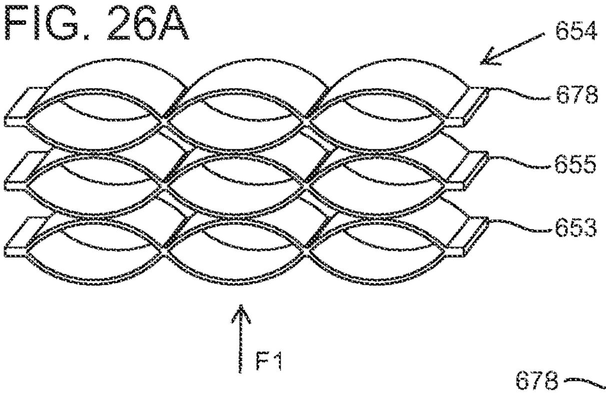
FIG. 26A-G are cross-sectional end views of the impact absorber embodiment of FIG. 25, illustrating the various stages of compression under an increasing load and/or a large load over time.
Figure 26B:
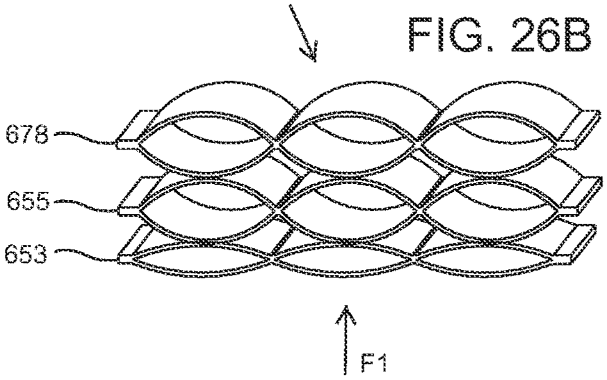
Figure 26C:
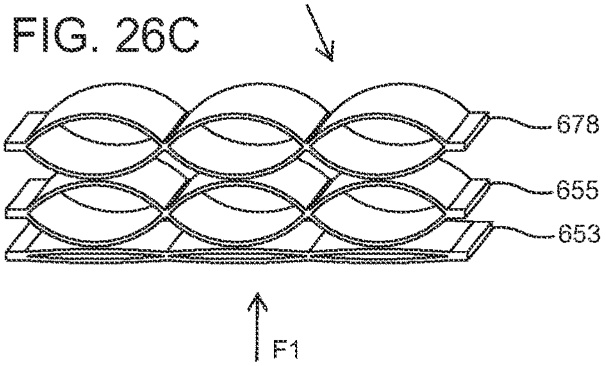
Figure 26D:
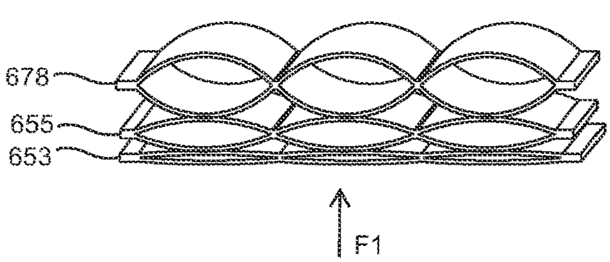
Figure 26E:
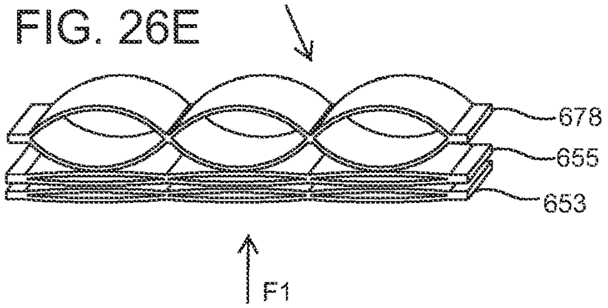
Figure 26F:
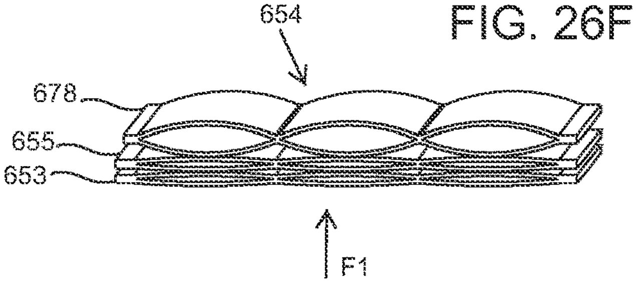
Figure 26G:
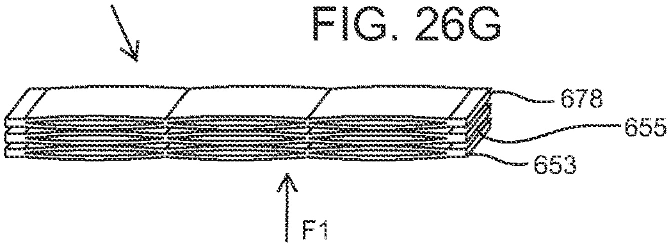

FIGS. 24A-H illustrate the example embodiment of FIGS. 22 and 23 absorbing an example impact and the resulting example deformation, where the impact absorber is positioned between the impacted object and the protected object (each not shown). Although particular deformations and series of deformations are illustrated, the type of deformation and the order of deformation can change depending on the nature of the force imparted on the impact absorber 50 and the nature of the material (both intentional design and unintentional properties inherent to the material at new or through age and use). FIG. 47A illustrates the end cross-sectional view of the impact absorber 50, in an initial state, with no external forces acting on it; however, in the helmet example, the wearer's head and the helmet shell can deform the impact absorber somewhat, where the initial state is not necessarily exactly as shown, but would behave in a similar manner for most or all of the deformation. Further, the nature of the deformation can depend on which portion of the impact absorber is being observed (e.g., near the impact area or a distance away from the impact area). FIGS. 48A-H illustrate the deformation at or near the impact area on the impacted object.

FIG. 24B shows an exemplary first deformation, where an impact force is applied to the first ply of sheet material 396 (through the impacted object, not shown, where the impact absorber is situated between the impacted object and the protected object). The pressure within the primary chamber 390 increases such that the second corrugated ply of sheet material 398 is pushed into contact with the third corrugated ply of sheet material 400 in the contact regions 440, where one or more legs of the trapezoidal corrugations are bowed or otherwise deformed to permit the collapse of all or part of the first chamber 392.

FIG. 24C illustrates an increase in force and/or pressure over time compared to FIG. 24B. Here, the force on the impacted object is sufficient to cause the outer ridges 414 of the first ply of sheet material 396 to be pushed down to a flat or substantially flat state, thus reducing the volume of the primary chamber 390. Further, the first ply of sheet material 396 is pushed into contact with the second corrugated ply of sheet material 398 at contact regions 442, further reducing the volume of the primary chamber 390, where the lateral sides of the primary chamber 390 are bowed or otherwise deformed to permit the collapse of all or part of the primary chamber 390.

FIG. 24D illustrates an increase in force and/or pressure over time compared to FIG. 24C. Here, the force on the impacted object is sufficient to cause the third corrugated ply of sheet material 400 pushed into contact with the fourth corrugated ply of sheet material 402 in the contact regions 444, thus reducing the volume of the second chamber 394.

FIG. 24E illustrates yet a further increase in force and/or pressure over time compared to FIG. 24D. The force on the impacted object is sufficient to cause the fourth corrugated ply of sheet material 402 pushed into contact with the fifth corrugated ply of sheet material 404 in the contact regions 446, where one or more legs of the trapezoidal corrugations are bowed or otherwise deformed to permit the collapse of all or part of the first chamber 393.

FIG. 24F illustrates an increase in force and/or pressure over time compared to FIG. 24E. Here, the force on the impacted object is sufficient to cause the outer ridges 414 of the sixth ply of sheet material 406 to be pushed down to a flat or substantially flat state, thus reducing the volume of the primary chamber 391. Further, the fifth corrugated ply of sheet material 404 is pushed into contact with the sixth ply of sheet material 398 at contact regions 448, further reducing the volume of the primary chamber 391, where the lateral sides of the primary chamber 391 are bowed or otherwise deformed to permit the collapse of all or part of the primary chamber 391.

FIG. 24G illustrates an increase in force and/or pressure over time and a rotational impact condition as shown in FIG. 17 by the force direction F2 compared to FIG. 24F. Here, the force on the impacted object is sufficient to cause the bowing other deformation (e.g., bending, folding, thickening, etc.) of multiple inner legs of the trapezoidal corrugations of plies 398 and 400 (which are contacting one another to form a double layer) as seen in the bending regions 450. This bending or other deformation (including prior deformations discussed above) both reduce volume of one or more chambers and can also, in one or more embodiments, act as a mechanical spring to further absorb and dissipate energy. The direction and type of bowing can also depend on the nature of the impact force—for example, whether the impact is more glancing or direct. Here, the bows are each curling in the same direction. However, they can each be configured to bow in a particular direction or they can each bow in differing directions and manners, depending on the force applied and the design.

FIG. 24H illustrates an increase in force and/or pressure over time compared to FIG. 24G. Here, the force on the impacted object is sufficient to cause the bowing other deformation (e.g., bending, folding, thickening, etc.) of multiple inner legs of the trapezoidal corrugations of multiple inner legs of the trapezoidal corrugations of plies 402 and 404 (which are contacting one another to form a double layer) as seen in the bending regions 452. The legs are alternately bowed opposite to the next, forming arch-like structures which can aid in controlling the reduction in volume within the primary chamber 391. However, the legs can be configured for a different bowing or deformation pattern.

Yet another exemplary embodiment of the present impact absorber 50 FIGS. 25 and 26A-G. Somewhat similar to the arrangements described in reference to FIGS. 3 and 4, the first inner absorption element 653, the second inner absorption element 655, and the third inner absorption element 678 are contained within the outer absorption element 652, and stacked one atop another therewithin. Each of the inner absorption elements 653, 655, and 678 are formed with one or more elongated chambers, that preferably provide fluid communication therethrough along the entire length of the inner absorption elements or at least parts thereof. The elongated chambers in this example comprise the first chamber 674, the second chamber 676, and the third chamber 680. Each of the elongated chambers is optionally connected to the neighboring chamber by a web 605 or other similar connecting structure to form panels (similar in concept to the panels described in reference to FIGS. 12-14). In this example, the cross-sectional shape each of the elongated chambers 674, 676, and 680 are generally oblong, that is in one example, the dimension of the chamber parallel with the impact force F1 (as illustrated in FIG. 1) is smaller than the dimension perpendicular to the force F1. In this example embodiment, the oblong shape can be one or more of (or a curvilinear combination of) an elliptical cross-sectional shape, an oval cross-sectional shape, a vesica piscis cross-sectional shape (with a radiused corner or a sharp or near zero radius), or other appropriate oblong shape with symmetric or nonsymmetric cross-section. The purpose of the oblong cross-sectional shape is to permit compression and total and/or partial collapse of the elongated chambers 674, 676, and 680 at least at the region of impact. Each of the elongated chambers 674, 676, and 680 includes a series of bending features 604, which are features that permit bending of the elongated chambers 674, 676, and 680. The bending features can be one or more of a necking (e.g., a portion of reduced cross-sectional size), a relief feature (e.g., a crease, groove, etc.), or any other feature that creates a bending weakness in the elongated chambers 674, 676, and 680. Similarly, the outer absorption element 652 includes similar bending features 602 that creates a bending weakness in the outer absorption element 652 so that the assembly of the inner absorption elements 653, 655, and 678 and the outer absorption element 652 can be bent and shaped to conform to a protected object PO and/or an impacted object IO. The bending features 602, 604 can be positioned evenly spaced or selectively spaced along part or all of the length.

Looking at FIGS. 26A-G, the progressive collapse of the inner absorption elements 653, 655, and 678 is illustrated, which, through energy absorption, gently deaccelerates the protected object PO, such that the absorption of a large impact force F1 results in a much smaller than expected acceleration on the protect object. It can be seen that the impact force F1 first partially then fully collapses the chambers of the first inner absorption elements 653, against one or both the bias of the spring force of the first inner absorption elements 653 and the pressure of the fluid contained therein and/or therearound. Similarly, each of the second inner absorption elements 655, then the third inner absorption elements 678 collapse to progressive deaccelerate by a progressive absorption of the impact force F1.

Yet another exemplary embodiment is illustrated in FIGS. 27-31, one or more of the plies of sheet material are molded or otherwise manufactured with indentations or hollow protrusions which are configured to fit one between the other in an intermeshing arrangement, generally with a space between adjacent protrusions. The impact absorber 50 of FIG. 272 includes a plurality or multiplicity of hollow fins or protrusions laterally aligned (e.g., laterally being normal to the longitudinal axis or annular axis) on one or more of the plies of the impact absorber 50.

Figure 27:
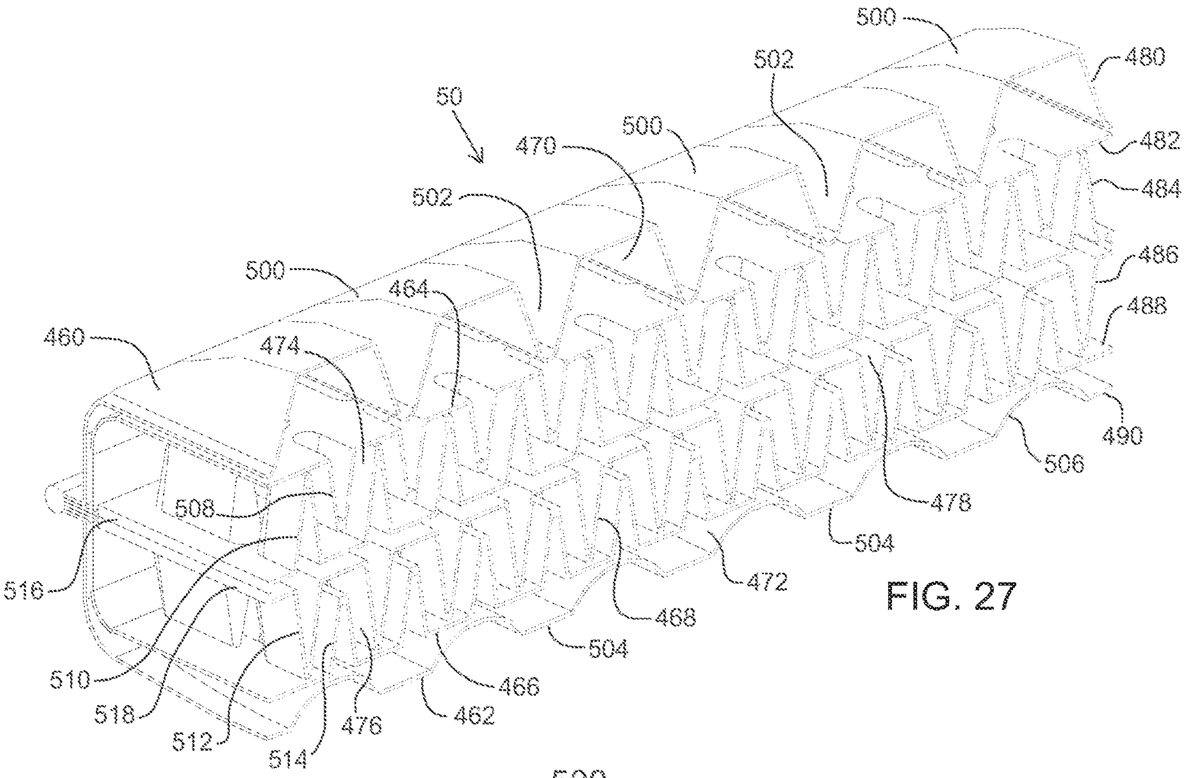
FIG. 27 is a cross-sectional perspective view of an alternate embodiment of the impact absorber.
Figure 28:
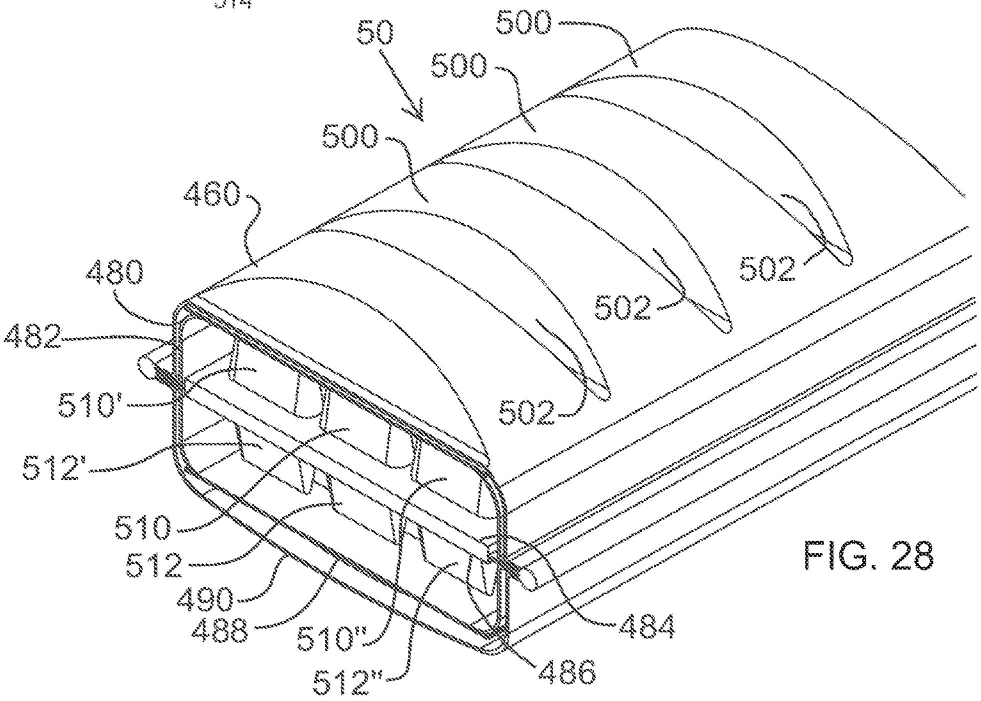
FIG. 28 is perspective view of the embodiment of FIG. 27.
Figure 29:
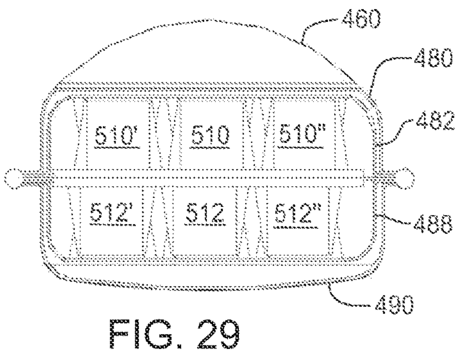
FIG. 29 is a cross-sectional end view of the embodiment of FIG. 27.
Figure 30:
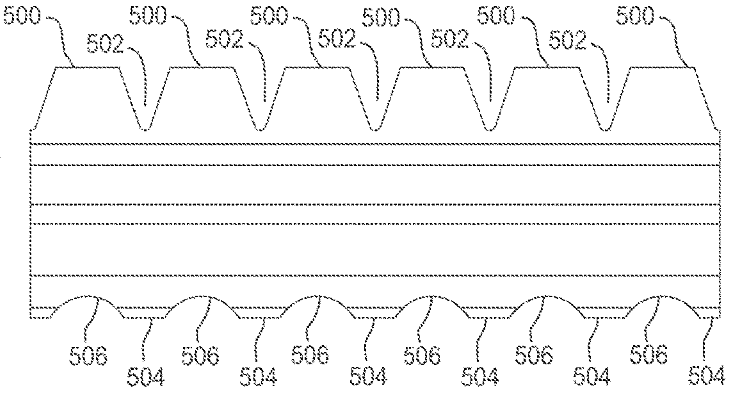
FIG. 30 is side view of the embodiment of FIG. 27.
Figure 31:
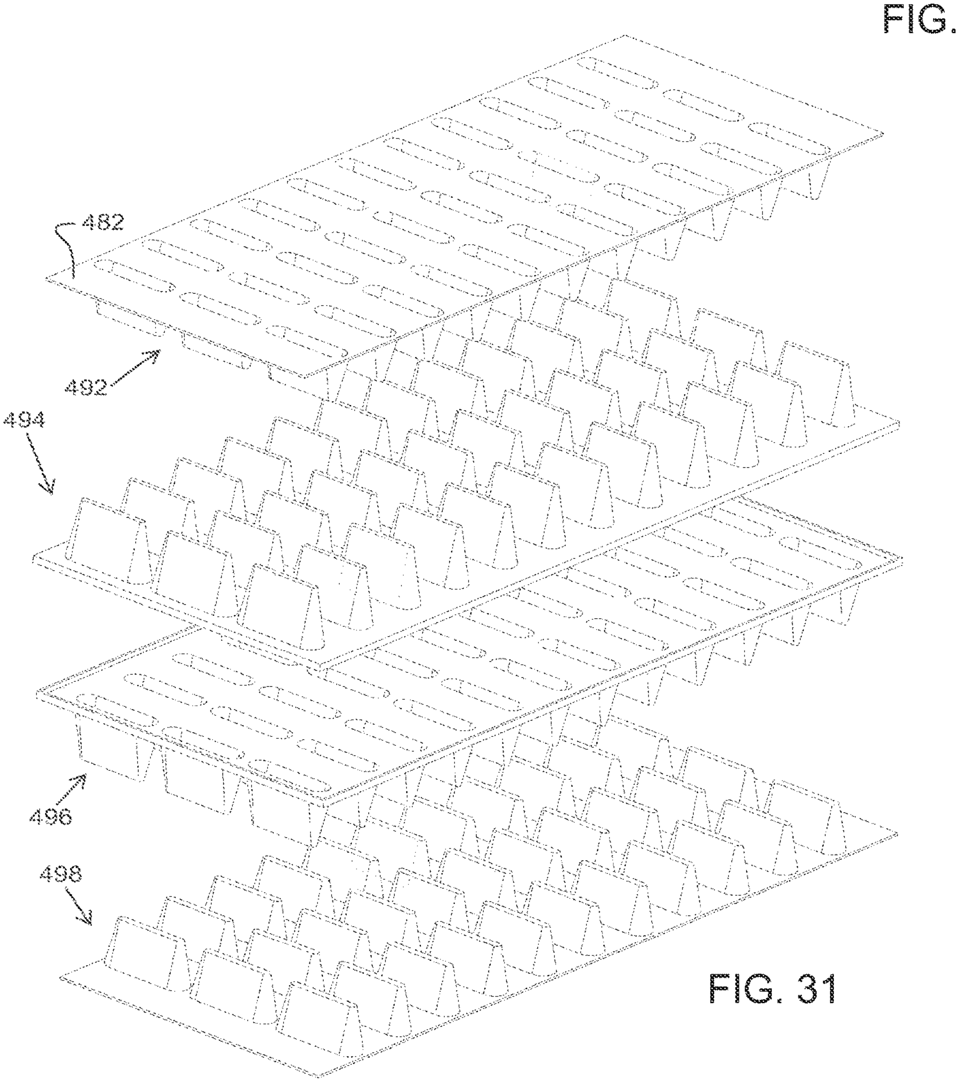
FIG. 31 is an exploded perspective view of an optional internal structure of FIG. 27 isolated from the remaining impact absorber structure.

Looking at FIG. 27, the outer absorption element 460 is made of a first ply of sheet material 480 sealed about the common perimeter with a second ply of sheet material 482 to define the primary chamber 470 between the two. At least one laterally aligned fin 508 (which represents the remaining multiplicity or plurality of fins 508, if present) is formed on the second ply of sheet material 482 and directed away from the first ply of sheet material 480 (e.g., the cavity comprising the underside of the fins 508 is facing toward the first ply of sheet material 480) and toward the third ply of sheet material 484. The fins 508 are generally arranged in a rectangular array with, in this example, three columns arranged such that the fins within each column are parallel and the fins in each row across the columns are aligned. Although this particular arrangement of the fins is illustrated and described, the fins may be in any arrangement, as required by the application, where the fin pattern may not be so aligned, and can be random, in chevron or zigzag patterns, in diagonal patterns, a pattern where the fins can be arranged according to the expected force application within each region (e.g., the pattern is either complex, changing from region to region, or other patterned or non-patterned arrangement). The fins 508, 510, 512, and 514 of the plies 480, 482, 484, 486, and 488, respectively, have substantially similar patterns to the above-described pattern (as well as the described alternate patterns). The first ply of sheet material 480 is formed with outer ridges 500, each being separated by grooves 502. The ridge 500 and groove arrangement 502 permit easy bending about the lateral axis (planar parallel to the flat portions of the plies and perpendicular to the longitudinal axis also planar parallel), provides additional cushioning.

The first inner absorption element 464 is made of the second ply of sheet material 482 sealed about the common perimeter with a third ply of sheet material 484 to define the first chamber 474 between the two. The second ply of sheet material 482 and the third ply of sheet material 484 each include the array of fins—the first array of fins 492 formed on the second ply of sheet material 482 and the second array of fins on the third ply of sheet material 484. Looking at fin 508 on ply 482 and fin 510 on ply 484 (each of which represent the remaining fins on the same ply, for this example embodiment), it can be seen that fin 510 is longer than fin 508, with the tip of the fin 510 touching or within close proximity of the flat portion of ply 482. However, fin 508 can be longer in one or more embodiments; or the fins 508, 510 can be the same size. Further, the fins 508, 510 are directed toward one another, where the distal end (e.g., the free end of the fin, where the fin is cantilevered on the ply) is situated adjacent to the long base of the opposing fin. Except for the fins at the ends of the columns, each fin is situated between two opposing fins, with an intermeshing or interlocking arrangement with a space between two opposing and interlocking fins (e.g., interlocking or intermeshing does not necessarily mean any portion of one fin is touching the opposing fin, or any fin for that matter).

The second inner absorption element 468 is made of the third ply of sheet material 484 sealed about the common perimeter with a fourth ply of sheet material 486 to define the second chamber 478 between the two. The perimeter walls 516, 518, respectively, of the third ply of sheet material 484 and the fourth ply of sheet material 486 may be abutted top edge to tope edge, to create a larger chamber 478 and provide an additional region which can compress under sufficient force. The fins 510, 512 of the third ply of sheet material 484 and the fourth ply of sheet material 486, respectively, are directed away from one another, where the distal ends of the fins are directed outwardly from the chamber 478. In this example embodiment, the fins 510 and 512 are directly opposite one another in a mirrored arrangement, although a staggered arrangement is possible.

The first inner absorption element 466 is made of the fourth ply of sheet material 486 sealed about the common perimeter with a fifth ply of sheet material 488 to define the first chamber 476 between the two. The first inner absorption element 466, in this example embodiment, is constructed much like first inner absorption element 464, but mirrored. However, the first inner absorption element 466 can be made different than the first inner absorption element 464 in one or more embodiments. Fins 512 and 514 of the fourth ply of sheet material 486 and fifth ply of sheet material 488, respectively, are similarly arranged in the intermeshing pattern as described in regards to the first inner absorption element 464.

Much like outer absorption element 460, yet in some respects mirrored, the outer absorption element 462 is made of the fifth ply of sheet material 488 sealed about the common perimeter with a sixth ply of sheet material 490 to define the primary chamber 472 between the two. The differences between the outer absorption element 460 and the opposite outer absorption element 462, is that outer absorption element 460, in some embodiments, has a larger volume primary chamber 470 than primary chamber 472 due to the ridges 500 being taller (e.g., further away from ply 482) than ridges 504, since the outer absorption element 460 is configured to be adjacent to the impacted object and the outer absorption element 462 is configured to be adjacent to the protected object. Between each ridge 462 is a groove 502. Alternatively, the sixth ply of sheet material 490 can be described as having a series of parallel grooves 506 formed laterally across the ply.

In at least some ways similar to the collapse and the compression shown in FIGS. 24A-H, the impact absorber 50 of FIGS. 27-31 can bow, collapse, change in pressure and volume, and so on, in response to an external force. In the helmet example, a glancing force can cause one or more of the intermeshing fins to shift so that the major faces contact to control the deformation of the plies and the dissipation of the force.

Although the above example embodiments illustrate ridges and fins as separate embodiments, the structures can be combined to include one or more of the fins, ridges, and cones, as well as other mechanically interfering structures, to create numerous impact absorber designs and configurations. All of the cavity spaces between the plies can have fluid pressures that are equal to, less than, or greater than the cavity adjacent to it on either side.

Figure 32:
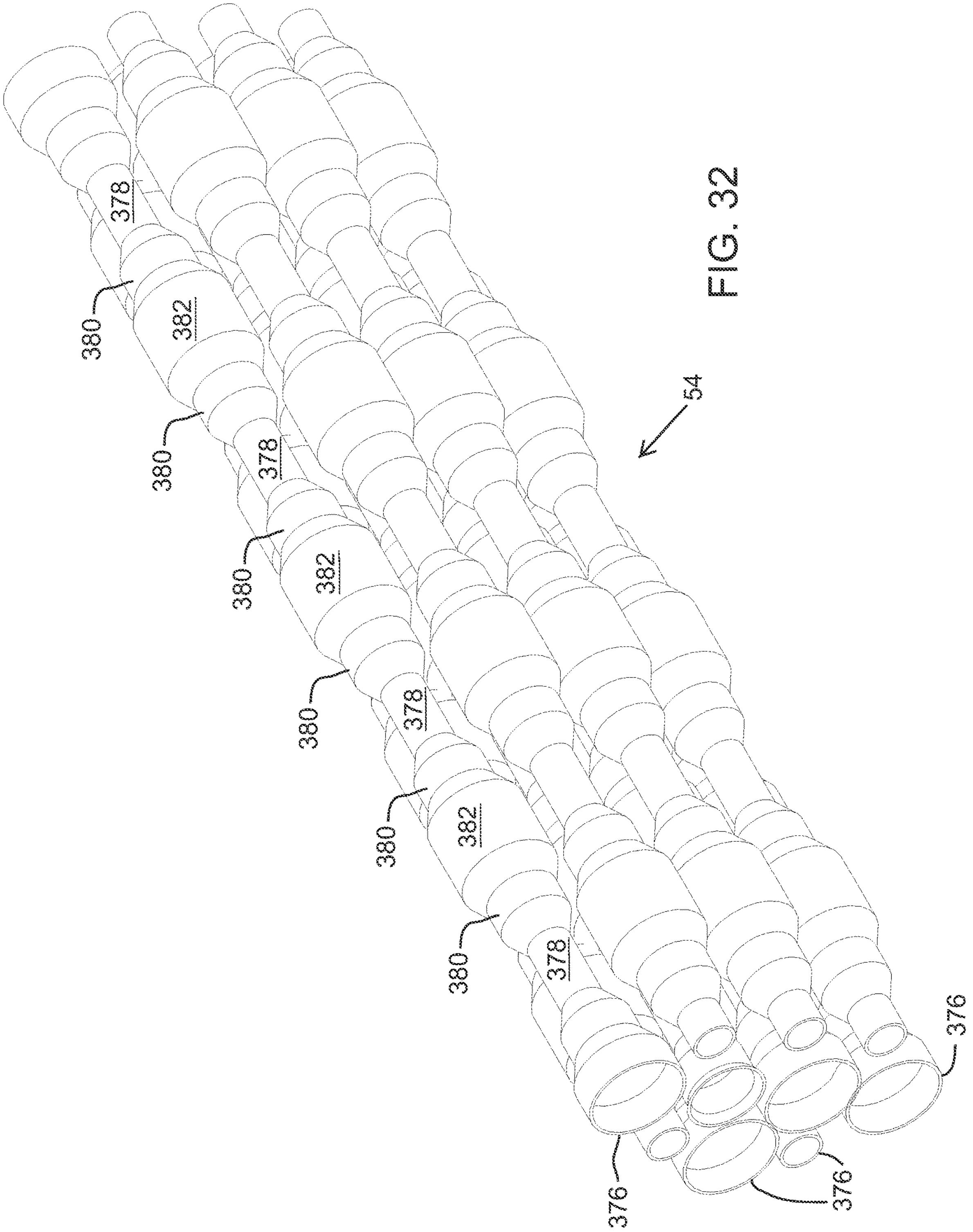
FIG. 32 is a perspective cross-sectional view of still another exemplary inner absorption element assembly.
Figure 33:
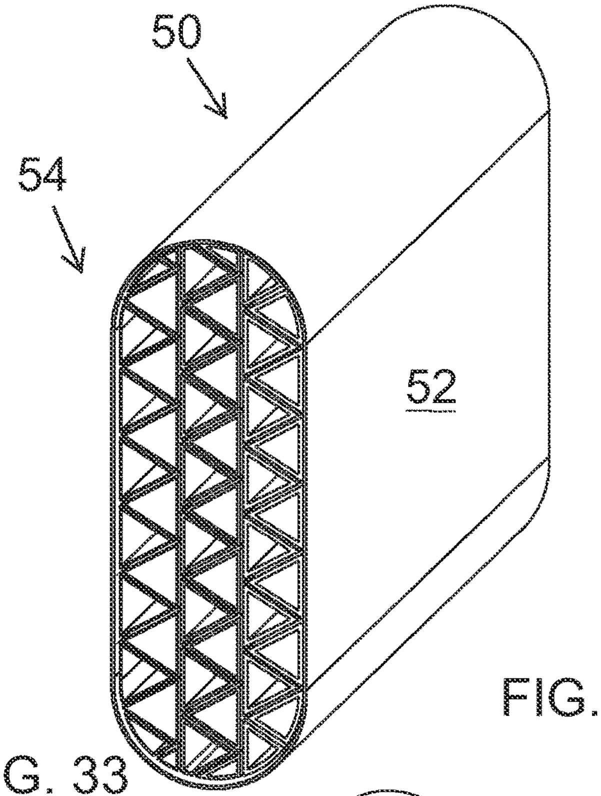
FIG. 33 is a perspective cross-sectional view of yet another exemplary impact absorber, illustrating a triangular cross-sectional shape of the three layers of inner impact absorbers arranged in an assembly, in accordance with at least one embodiment.
Figure 35:
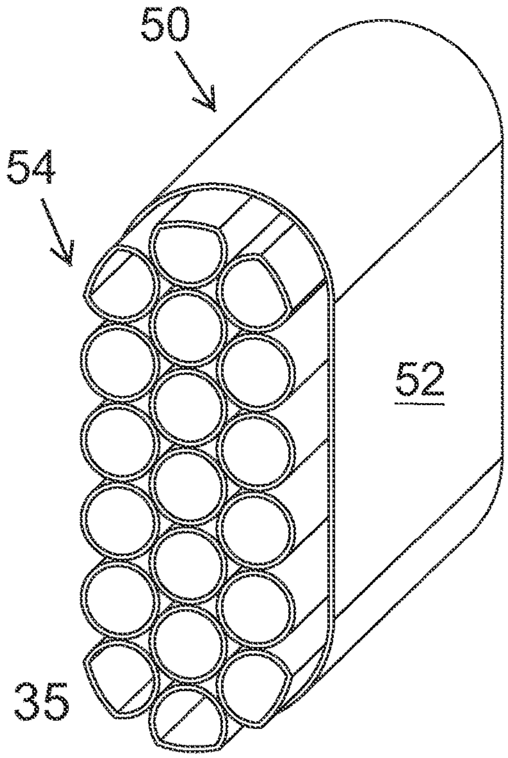
FIG. 35 is a perspective cross-sectional view of yet another exemplary impact absorber, illustrating a full or partial circular cross-sectional shape of the three layers of inner impact absorbers arranged in an assembly, in accordance with at least one embodiment.
Figure 34:
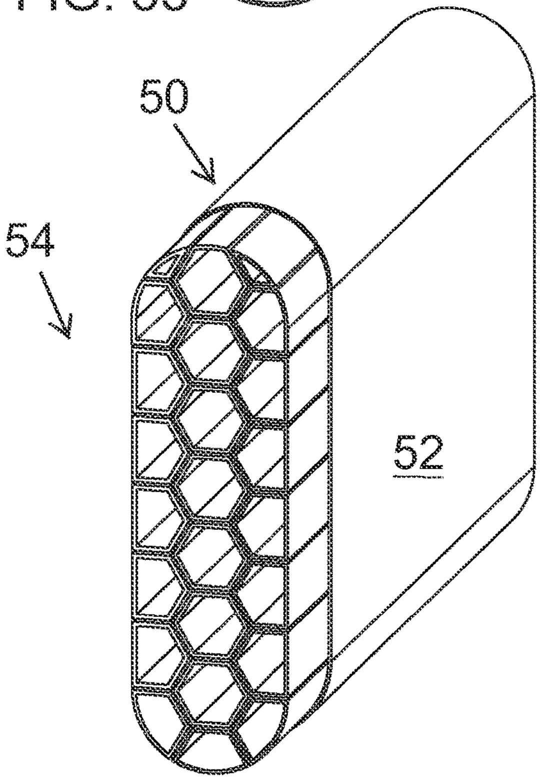
FIG. 34 is a perspective cross-sectional view of yet another exemplary impact absorber, illustrating a full or partial hexagonal cross-sectional shape of the three layers of inner impact absorbers arranged in an assembly, in accordance with at least one embodiment.
Figure 36:
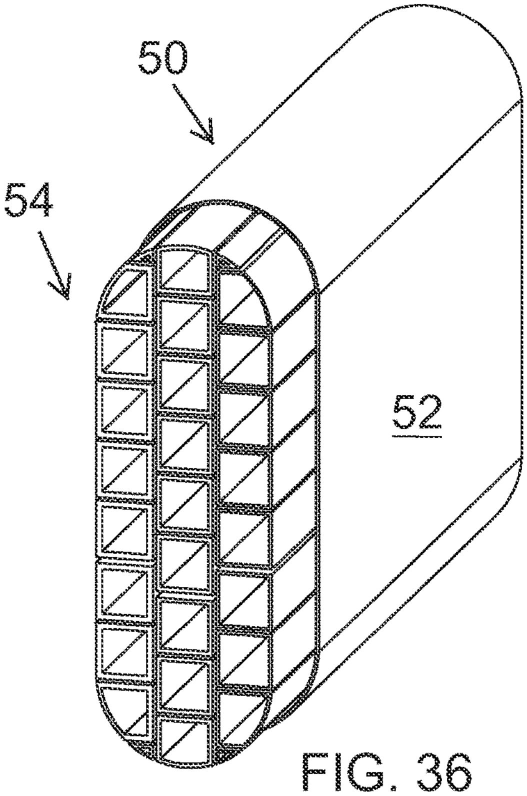
FIG. 36 is a perspective cross-sectional view of yet another exemplary impact absorber, illustrating a full or partial square cross-sectional shape of the three layers of inner impact absorbers arranged in an assembly, in accordance with at least one embodiment.

Turning to FIGS. 32, an embodiment of the inner absorption element assembly 54 is illustrated, and comprises a plurality of elongated inner absorption elements 376 shaped as round tubes with a cross-sectional diameter that varies in diameter (e.g., by stepping or by gradual change) along its length. Other cross-sectional shapes, such as those shown in other figures herein, can be used, which step down and up varying the size (e.g., width, diameter, or other equivalent cross-sectional measurement) and thus the wall thickness due to the properties known as blow ratio. In the illustrated example embodiment, the elongated inner absorption elements 376 vary in diameter, from a first diameter 378, transitioning by bevel to a second diameter 380, and transitioning by bevel to a third diameter 382. From the third diameter 382, the elongated inner absorption element 376 transitioning by bevel back to the second diameter 380, then transitioning by bevel back to the first diameter 378, in a repeating pattern for each of the elongated inner absorption elements 376. Of course, this pattern of changing diameters can change, and can be repeating or nonrepeating.

The elongated inner absorption element 376 is filled with a second fluid at a second pressure. In one or more embodiments, the wall thickness of the elongated inner absorption element 376 varies approximately inversely proportional to the diameter or other measurement of cross-sectional size. In this example embodiment, the third diameter 382 is largest and, thus, has the thinnest wall thickness. And, the first diameter 378 is smallest and, thus, has the thickest wall thickness (with the second diameter 380 having an intermediate wall thickness). The neighboring elongated inner absorption elements 376 within the assembly 54 may be arranged in an interlocking pattern, where the sections having the third diameter 382 are closely nested within the neighboring sections having the first diameter 373, which restricts longitudinal travel of one elongated inner absorption element 376 relative to the neighboring elements. Further, the interlocking pattern saves space (e.g., creating a thinner assembly) and offers varying different impact absorption rates due to the varying wall thicknesses. Alternatively, the neighboring elongated inner absorption elements 376 within the assembly 54 may be arranged in an non-interlocking pattern and/or a combination of interlocking and non-interlocking arrangements.

Although not shown, the inner absorption element assembly 54 is, in one or more embodiments, is hermetically contained within an outer absorption element, and surrounded by a primary fluid at a first pressure. When an impact force is applied to the present impact absorber, the fluid pressures increases in non-impacted regions. The areas of high pressure will deform by increasing wall thickness and/or changing diameter, as described above. In at least one example embodiment, the areas of the thinnest wall thickness will balloon out (i.e., increase in diameter). In this example, the sections having the third diameter 382 will balloon out to absorb energy and further interlock with the neighboring sections having the first diameter 378, which increases the frictional contact and interference to further prevent longitudinal travel of one elongated inner absorption element 376 relative to the neighboring elements.

Constructed much like above-described examples. FIGS. 33-36 illustrate multiple variations of the inner absorption element assembly 54, where triangular inner absorption elements are bundled together in FIG. 29, where hexagonal or partial hexagonal shapes are bundled together in FIG. 34, where circular or semicircular shapes are bundled together in FIG. 35, and rectangular or partial rectangular shapes are bundled together in FIG. 36.

Figure 37:
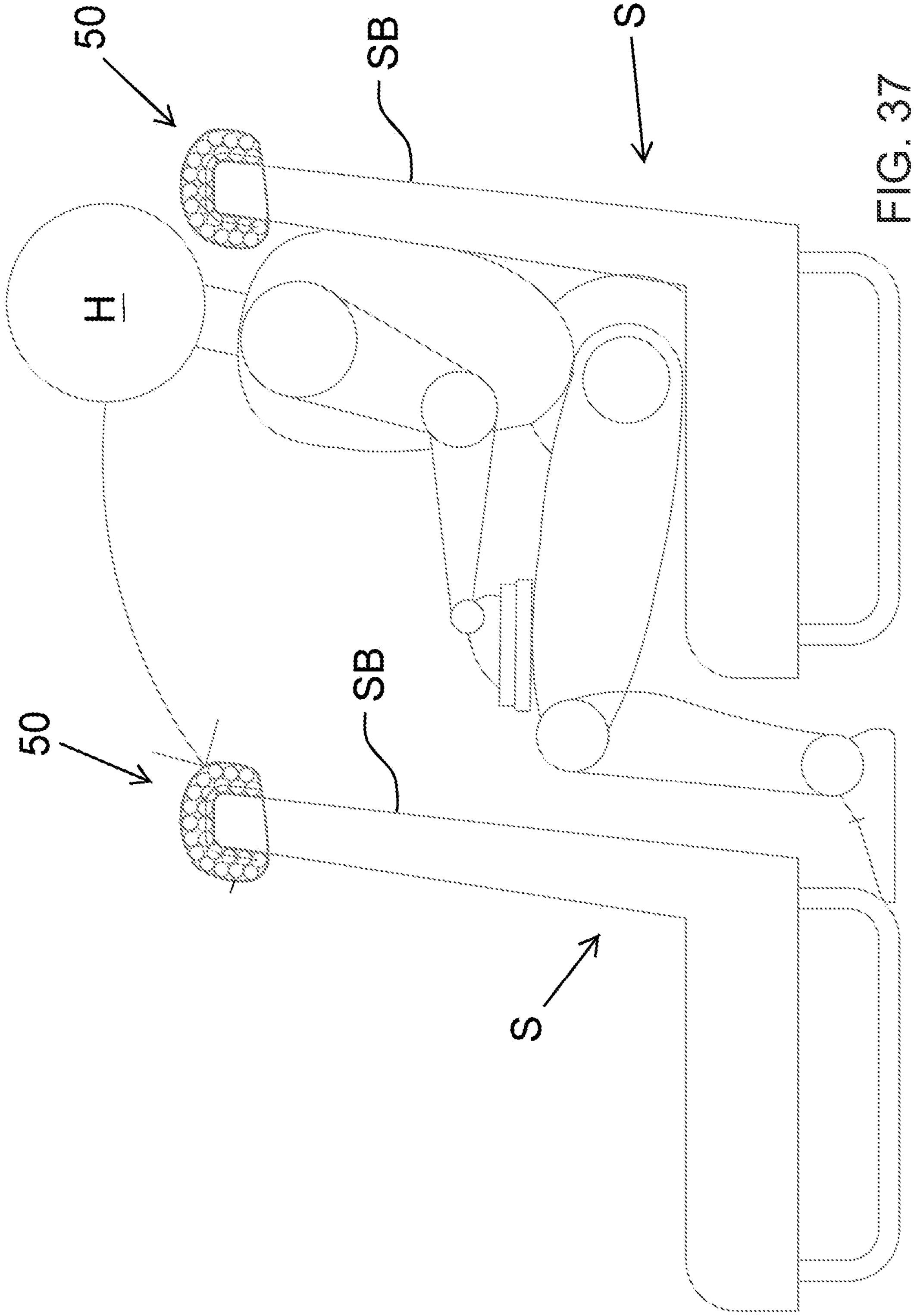
FIG. 37 is a side schematic view of an alternate embodiment of the impact absorber attached to the top edges of two seat backs of a bus bench seat.

Although the above example applications of the present impact absorber 50 have been related to personal protective equipment, there are numerous applications for various available configurations of the present impact absorber 50. FIGS. 37-41 illustrate several of the numerous real-life applications. FIG. 37 illustrates the interior of a typical bus or other similar motor vehicle, such as a school bus, which may lack sufficient restraint to prevent a person's head H from striking the seat back SB of the seat S immediately to the front. Without sufficient restraint and protection, striking the seat back SB can result in head trauma and/or other injuries. An impact absorber 50 is schematically illustrated as being complimentarily shaped to fit over or otherwise be attached to the top or other portion of the seat back SB. In this example, a cavity in the impact absorber 50 receives the top portion of the seat back SB therein, such that an impact by the head or other body part is absorbed and injury prevented, as described with the various embodiments above. In this example, the protected object is the head H with the seat back SB acting as a structure for supporting the position of the impact absorber 50 and as the impacted object, except the head H strikes the impact absorber 50 and the impact force F1 may be generated from the has impacting a third object. Although the initial arrangement of the components of collision are different than, for example, FIG. 1, at the instant the head H impacts the impact absorber 50, the dynamics of the energy absorption are very similar.

Figure 38:
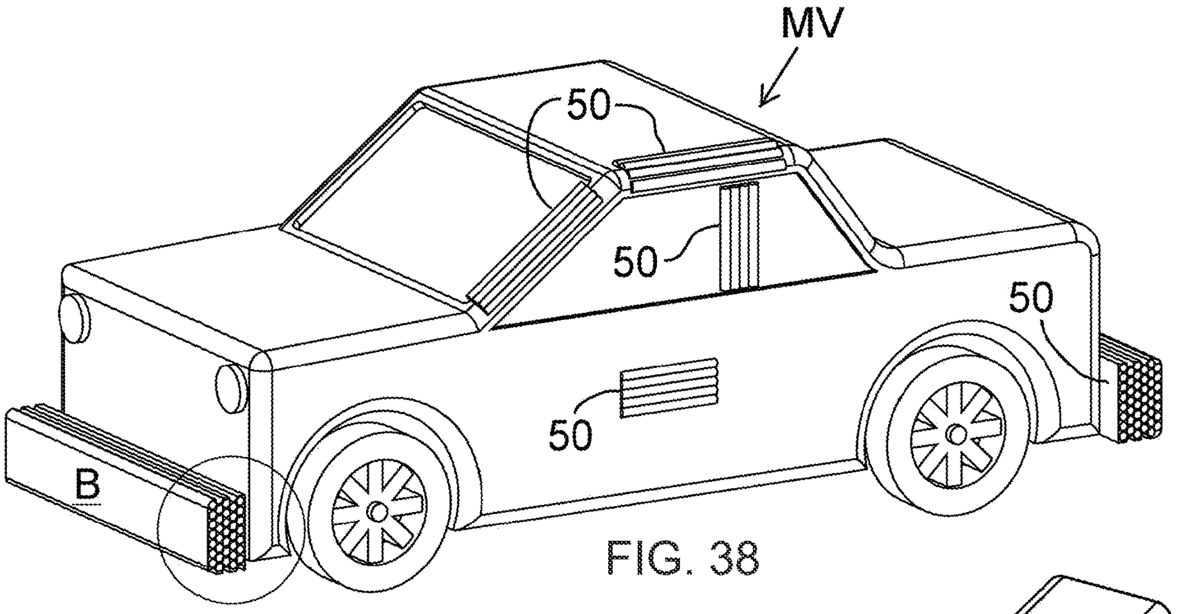
FIG. 38 is a perspective schematic view of an alternate embodiment of the impact absorber attached to various impact regions of a motor vehicle.
Figure 39:
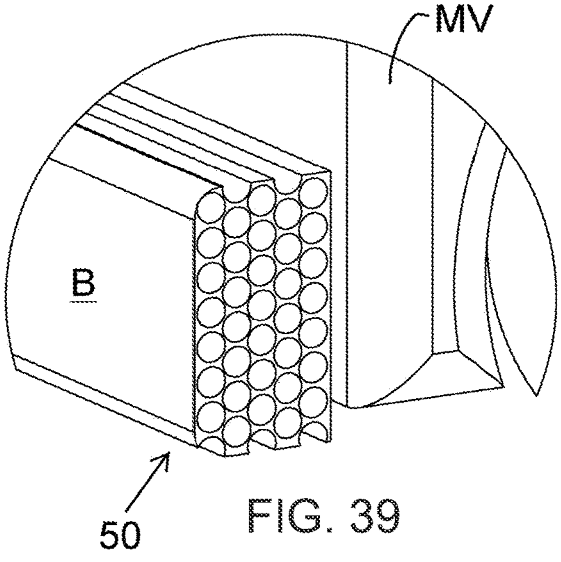
FIG. 39 is a magnified perspective schematic view of the impact absorber of FIG. 38.

Looking at FIGS. 38-39, various areas of a motor vehicle include the present impact absorber 50, such as the bumpers B, the various pillars (A, B, C, D, etc.), the doors, interior areas, and other areas where an outside object impacts the motor vehicle MV or where the passengers and/or cargo impact the motor vehicle MV. Looking at the bumper example, the inner absorption elements and outer absorption elements are each filled with a fluid which is pressurized, likely to a much higher pressure than the personal protective equipment examples. Further, the materials of the various impact absorbers 50 of the bumper B (as well as others made for absorbing a collision) can be made of a much stranger material, such as various metal alloys, plastics, composite materials, aramids fibers, fabrics, steel reinforced rubber, plastic tubing, and so on, that are configured to controllably deform under the tremendous impact forces of a typical vehicle collision. This deformation may be elastic in nature, where the impact absorber 50 returns to its original or near-original shape, or a permanent deformation, which will absorb the energy of the collision without substantial rebound.

Figure 40:
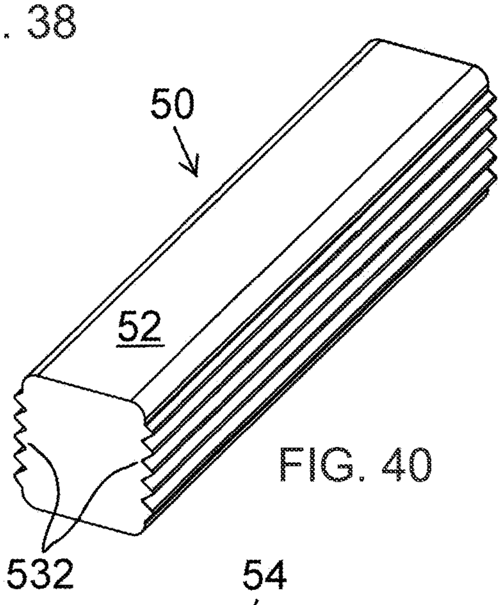
FIG. 40 is perspective schematic view of an alternate embodiment of the impact absorber.
Figure 41:
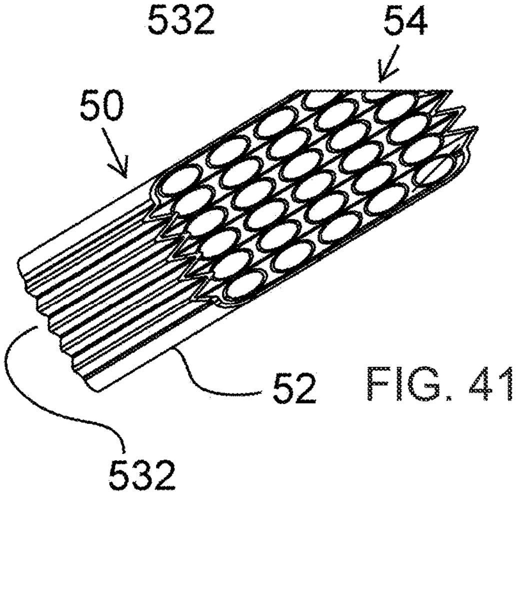
FIG. 41 is cross-sectional perspective view of the embodiment of FIG. 40.

FIGS. 40-41 illustrates the present impact absorber 50 arranged as a loading dock bumper LDB or other similar protective equipment attached to the building structure or other surrounding structure, for absorbing the impact of a trailer traveling in reverse, which protects both the trailer and the loading dock structures. Further, the impact absorber 50 creates an effective weather seal due to compression of the impact absorber 50 which fills voids between the truck and the loading bay. The structure of the impact absorber 50 includes the outer absorption element 52 surrounding the inner absorption element assembly 54. Pleats 532 or other folding structure can be included on one or more sides of the impact absorber 50, such as be forming the pleats 532 on the outer absorption element 52, such that the pressure of the trailer compresses the impact absorber 50 by collapsing the pleats 532.

As discussed above, in one or more embodiments, the impact absorber 50 generally includes an outer absorption element 52 enclosing an inner absorption element 53 (one or more inner absorption elements). Where a first fluid 56 is contained within the outer absorption element 52 and surrounding the inner absorption element 53. And where a second fluid 58 is contained within the inner absorption element 53. However, the example embodiments of FIGS. 42-45 illustrate an impact absorber 50 in which the inner absorption element 53 contains one or more support structures 534 occupying at least some of the first chamber 72 within the inner absorption element 53. The support structures 534 take many forms, such as a lattice form, a cellular foam form, or a variety of other forms as required for a particular application.

The support structure 534 can include a wide variety of structures with a variety of structural properties. The support structure 534 can be manufactured by a wide variety of manufacturing techniques, including 3D printing, injection molding, blow molding, and other techniques. For example, a highly customized support structure 534 (e.g., with designs that take into account specific stress profiles, including biometric data or the like) may require that the support structure 534 be printed using additive manufacturing techniques (e.g., 3D printing), using 3D models files created by scanning biometric or other real-world data using digital scanning or photography. Further, the support structure 534 can be made of a material that is elastomeric or has similar or different properties of elastomeric materials which permit the support structure 534 to recover its original or near original shape shortly after an impact, with little or no permanent deformation. In one or more embodiments, the support structure 534 recovers is original shape after impact faster than one or both of the inner absorption element 53 and the outer absorption element 52, such that the support structure 534 pushes outwardly on at least the inner absorption element 53 to aid in the recovery of the inner absorption element back to its original shape, perhaps before the fluid has had a chance to return to the area of the impact. In one or more embodiments, the support structure 534 recovering its original shape will pull the displaced fluid back to the area of impact quicker, so that the impact absorber 50 is more quickly reset and ready for another impact shortly after the prior impact.

Figure 42:
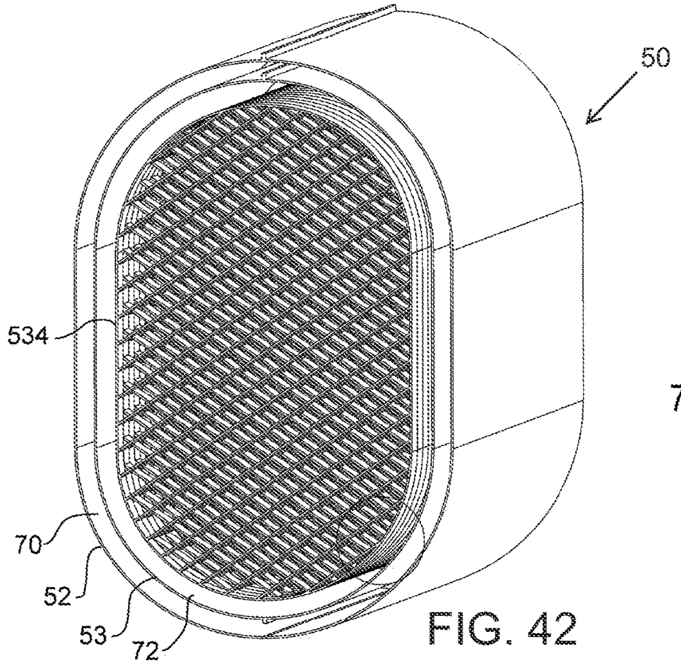
FIG. 42 is a cross-sectional perspective view of an alternate embodiment of the impact absorber.
Figure 43:
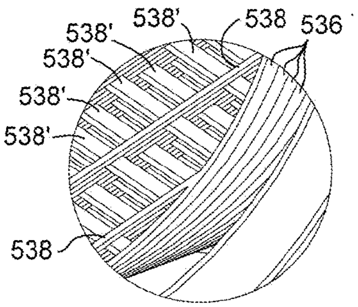
FIG. 43 is a perspective magnified view of the inner absorption element assembly of FIG. 42.

The impact absorber illustrated in FIGS. 42 and 43 show one example support structure 534, generally including a stacked series of elements (either connected or separate), each including a perimetral frame 536 with a series of parallel cross members 538 extending diagonally across the perimetral frame 536. The cross members 538 of each successive layer of elements can be transverse to or offset to the neighboring cross members 538. In this example, the cross members 538 are strips of material (such as a plastic material and/or 3D printed material) with a rectangular cross-section extending across the perimetral frame 536 (and/or with a round, hollow tubular, tapered column, or a rectangular beam cross section shown in FIG. 43 extending between the perimeter walls), where each of the cross members 538 are able to move independently of the other cross members 538 within the same plane or of neighboring planes. The diagonal crossing arrangement of the cross members 538 can aid in recovery of the original shape of the impact absorber 50. The fluid within the inner absorption element 53 surrounds and fills the voids within the support structure 534; and is able to move around and through the support structure 534.

Figure 44:
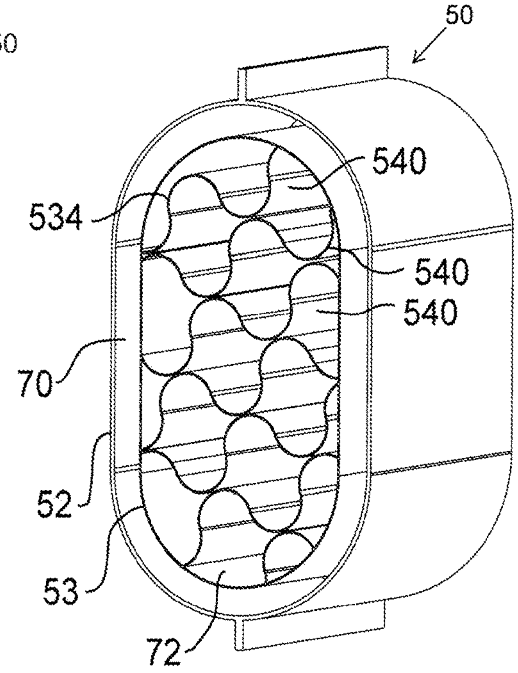
FIG. 44 is a cross-sectional perspective view of an alternate embodiment of the impact absorber.
Figure 45:
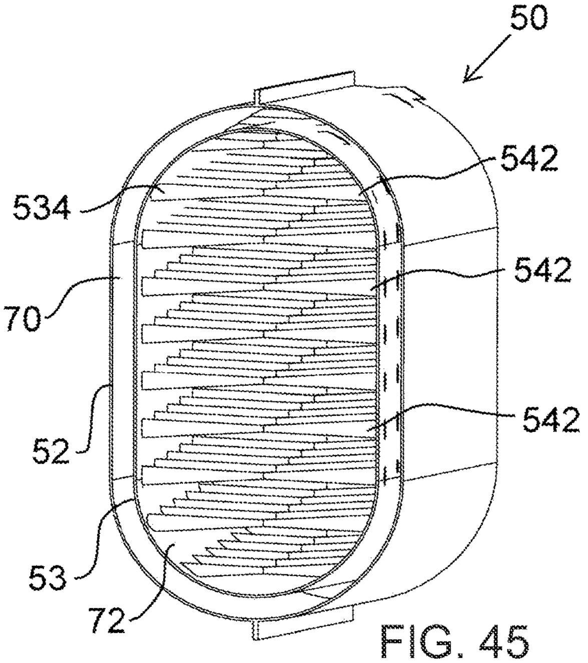
FIG. 45 is a cross-sectional perspective view of an alternate embodiment of the impact absorber.

The support structure 534 of FIG. 44 illustrates yet another form, a series of corrugated sheets 540 arranged diagonally in parallel, touching crest-to-crest in this example. The crests may be connected together to form a single structure or remain unconnected. The support structure 534 of FIG. 45 illustrates yet another form, a multiplicity of cones 542 (or other columnar structures) extending into the inner absorption element 53.

Aspects of the present specification may also be described as follows:

An impact absorber configured to be positioned between a protected object and an impacted object during use, the impacted object configured to be impacted by an outside object, the impact absorber comprising: an outer absorption element comprising an outer wall enclosing a primary chamber, the primary chamber configured to hermetically contain a first fluid under a first pressure, the outer wall comprising an impacted side and a protected side, the protected side being configured to be directed toward the protected object during use, and the impacted side being configured to be directed toward the impacted object during use; and a first inner absorption element comprising a first wall enclosing a first chamber, the first inner absorption element being positioned within the primary chamber with the first chamber being surrounded by the first fluid, the first chamber configured to hermetically contain a second fluid under a second pressure, the second pressure being different from or equal to the first pressure.

The impact absorber wherein the outer absorption element further comprising a first control valve configured to selectively regulate fluid communication between the outer absorption element and a fluid source, and the first inner absorption element further comprising a second control valve configured to selectively regulate fluid communication between the first inner absorption element and the fluid source.

The impact absorber wherein the first control valve comprising a first on/off valve in series with a first check valve, the first on/off valve being positioned between the outer absorption element and the first check valve and being configured to selectively permit fluid flow between the outer absorption element and the first check valve; and the second valve comprising a second on/off valve in series with a second check valve, the second on/off valve being positioned between the first inner absorption element and the second check valve and being configured to selectively permit fluid flow between the first inner absorption element and the second check valve.

The impact absorber wherein, in during an inflation procedure the first on/off valve is opened to bring the first check valve in fluid communication with the outer absorption element, the first check valve is calibrated to permit fluid flow into the outer absorption element until the first fluid is pressurized to the first pressure, whereupon the first check valve closes; and the second on/off valve is opened to bring the second check valve in fluid communication with the first inner absorption element, the second check valve is calibrated to permit fluid flow into the first inner absorption element until the second fluid is pressurized to the second pressure, whereupon the second check valve closes.

The impact absorber wherein the first check valve permits fluid flow into the outer absorption element during an inflation procedure; and the second check valve permits fluid flow into the first inner absorption element during the inflation procedure.

The impact absorber wherein each of the first check valve and second check valve comprising a valve body with a passage formed therethrough, the passage comprising a fluid inlet and a fluid outlet, a chamber formed within an expanded portion of the passage, a valve seat formed within the chamber closest to the fluid inlet and a limiter formed within the chamber opposite the valve seat; a valve element positioned within the chamber formed within an expanded portion of the passage where the valve element is movable within the chamber and captured between the valve seat and the limiter; and a spring connecting the valve element and the valve body.

The impact absorber wherein during operation of the first check valve when the first on/off valve is open and the outer absorption element is inflated at the first pressure, the valve element bears against the valve seat to close the passage; and wherein when the first on/off valve is open and the outer absorption element is in the process of being inflated yet not at the first pressure, the valve element is positioned between the valve seat and the limiter to permit fluid flow through the passage.

The impact absorber wherein, when the first on/off valve is closed, the valve element is positioned between the valve seat and the limiter.

The impact absorber wherein the spring is a first spring that is calibrated to permit fluid flow into the outer absorption element until the outer absorption element is pressurized to the first pressure.

The impact absorber wherein during operation of the second check valve when the second on/off valve is open and the first inner absorption element is inflated at the second pressure, the valve element bears against the valve seat to close the passage and wherein when the second on/off valve is open and the first inner absorption element is in the process of being inflated yet not at the second pressure, the valve element is positioned between the valve seat and the limiter to permit fluid flow through the passage.

The impact absorber wherein, when the second on/off valve is closed, the valve element is positioned between the valve seat and the limiter.

The impact absorber wherein the spring is a second spring that is calibrated to permit fluid flow into the first inner absorption element until the first inner absorption element is pressurized to the second pressure.

The impact absorber wherein the valve element is a ball.

The impact absorber wherein the first check valve comprises a first passage with a first inlet and a first outlet, the first outlet in fluid communication with the outer absorption element; the second check valve comprises a second passage with a second inlet and a second outlet, the second outlet in fluid communication with the first inner absorption element; and a fluid manifold being in fluid communication with both the first inlet of first passage and the second inlet of the second passage, the fluid manifold being in further communication with a fluid source.

The impact absorber wherein the fluid source comprises a pump.

The impact absorber wherein the pump is one of a hand pump and an electric pump.

The impact absorber wherein the pump is one of an integral hand pump and an external hand pump.

The impact absorber wherein the pump is one of an integral electric pump and an external electric pump.

The impact absorber wherein a pressure release valve is in fluid communication with the fluid manifold, the pressure release valve being calibrated to release pressure when both the first passage and the second passage are closed off due to two or more of the first check valve, the second check valve, the first on/off valve, and the second on/off valve being closed.

The impact absorber wherein the pressure release valve comprises an audible pressure release valve that emits an audible sound due to release of pressure therethrough.

The impact absorber further comprising a third check valve comprising that restricts the flow of a third fluid out of a second inner absorption element when the second inner absorption element is inflated and permits fluid flow into the second inner absorption element during the inflation procedure; the third check valve comprises a third passage with a third inlet and a third outlet, the third outlet in fluid communication with the second inner absorption element; the fluid manifold being further in fluid communication with the third inlet of the third passage.

The impact absorber further comprising a second inner absorption element comprising a second wall enclosing a second chamber, the second inner absorption element being positioned within the primary chamber and configured to be surrounded at least in part by the first fluid, the second chamber configured to hermetically hold a third fluid under a third pressure.

The impact absorber wherein the first inner absorption element is positioned adjacent to the impacted side and the second inner absorption element is positioned between the first inner absorption element and the protected side.

The impact absorber wherein the first inner absorption element comprises a first wall thickness, a first cross-section wall shape, a first flexural modulus, and a first material; and the second inner absorption element comprises a second wall thickness, a second cross-section wall shape, a second flexural modulus, and a second material.

The impact absorber wherein the first wall thickness is greater than the second wall thickness.

The impact absorber wherein the first flexural modulus is greater than the second flexural modulus.

The impact absorber wherein the first cross-section wall shape differs from the second cross-section wall shape.

The impact absorber wherein the first cross-section wall shape is the same as the second cross-section wall shape.

The impact absorber wherein the first material differs from the second material.

The impact absorber wherein the first material is the same as the second material.

The impact absorber wherein the first pressure is greater than the second pressure.

The impact absorber wherein the first pressure is less than the second pressure.

The impact absorber wherein the first pressure is greater than both the second pressure and the third pressure.

The impact absorber wherein the first pressure is less than both the second pressure and the third pressure.

The impact absorber wherein the second pressure is greater than the third pressure.

The impact absorber wherein the first pressure differs from the second pressure, and the first pressure differs from atmospheric pressure.

The impact absorber wherein the first cross sectional wall shape and the second cross sectional wall shape are one or more of a polygon, a circle, an ellipse, a triangle, a rectangle, a square, a pentagon, and a hexagon.

The impact absorber wherein the outer absorption element is an outer elongated tube that is sealed to control the first pressure and the first inner absorption element is a first inner elongated tube that is sealed to control the second pressure.

The impact absorber wherein the first pressure in the outer elongated tube is controlled by a first valve and the second pressure in the first inner elongated tube is controlled by a second valve.

The impact absorber wherein the first wall of the first inner absorption element is configured as an inflated panel with the first chamber being defined within the inflated panel, the first chamber being divided at least in part by an elongated seam to define a first elongated chamber and a second elongated chamber, the first elongated chamber in fluid communication with the second elongated chamber.

The impact absorber wherein the first chamber is further divided at least in part by a second elongated seam to define a third elongated chamber and a fourth elongated chamber, the third elongated chamber in fluid communication with the fourth elongated chamber.

The impact absorber wherein the first elongated seam is arranged in a first direction and the second elongated seam is arranged in a second direction differing from the first direction, and wherein the first elongated chamber and the second elongated chamber are in fluid communication with the third elongated chamber and the fourth elongated chamber.

The impact absorber wherein the first elongated chamber and the second elongated chamber are in fluid communication with the third elongated chamber and the fourth elongated chamber.

The impact absorber wherein the first elongated seam and the second elongated seam intersect to form a manifold region wherein at least one of the first elongated chamber and the second elongated chamber intersects at least one of the first elongated chamber and the second elongated chamber, and wherein at least some of the fluid communication occurs through the manifold region.

The impact absorber wherein the inflated panel is furcated to form a first impact zone and a second impact zone, each of the first impact zone and the second impact zone extending separately from a common impact zone, wherein the second fluid is permitted to travel between the first impact zone and the second impact zone through the manifold region.

The impact absorber wherein the first impact zone comprising the first elongated chamber and the second elongated chamber, and the second impact zone comprising the third elongated chamber and the fourth elongated chamber.

The impact absorber wherein the inflated panel is further furcated to form a third impact zone extending from the common impact zone, the third impact zone comprising a fifth elongated chamber and a sixth elongated chamber defined by a third elongated seam, the fifth elongated chamber and the sixth elongated chamber in fluid communication with each of the first elongated chamber, the second elongated chamber, the third elongated chamber, and the fourth elongated chamber.

The impact absorber wherein the impacted object is an outer shell of an item of personal protective equipment.

The impact absorber wherein the item of personal protective equipment is a helmet.

The impact absorber wherein the impacted object is a bumper cover of a bumper.

The impact absorber wherein the impacted object is an outer shell of an item of personal protective equipment.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular article, apparatus, methodology, protocol, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope. Further, although separate embodiments and described and illustrated herein, one or more aspects of each of these embodiments, when compatible, can be combined and reconfigured and/or substituted to create yet more embodiments in keeping with the present invention.

Lastly, the terminology used herein is for the purpose of describing particular embodiments only, and is not intended to limit the scope of the present invention, which is defined solely by the claims. Accordingly, the present invention is not limited to that precisely as shown and described.

The invention claimed is:

1. An impact absorber configured to be positioned between a protected object and an impacted object during use, the impacted object configured to be impacted by an outside object, the impact absorber comprising:

an outer absorption element comprising an outer wall enclosing a primary chamber, the primary chamber configured to hermetically contain a first fluid under a first pressure, the outer wall comprising an impacted side and a protected side, the protected side being configured to be directed toward the protected object during use, and the impacted side being configured to be directed toward the impacted object during use;

a first inner absorption element comprising a first wall with a first cross-sectional wall shape enclosing a first chamber, the first inner absorption element being positioned within the primary chamber and being substantially surrounded by the first fluid, the first chamber configured to hermetically contain a second fluid under a second pressure, the first inner absorption element being positioned adjacent to the impacted side with the first chamber longitudinally arranged alongside the impacted side so that the second fluid is permitted to flow from a first portion of the impacted side to a second portion of the impacted side apart from the first portion through the first chamber; and a second inner absorption element comprising a second wall with a second cross-sectional wall shape enclosing a second chamber, the second inner absorption element being positioned within the primary chamber and being substantially surrounded by the first fluid, the second chamber configured to hermetically contain a third fluid under a third pressure with the second wall separating the first fluid from the third fluid, the second inner absorption element being wholly positioned between the first inner absorption element and the protected side, with the second chamber arranged substantially parallel to the first chamber so that the third fluid is permitted to flow from the first portion of the impacted side to the second portion of the impacted side apart from the first portion through the second chamber, the first cross-sectional wall shape is different than the second cross-sectional wall shape.

2. The impact absorber of claim 1 further comprising:

a first on/off valve in series with a first check valve configured to selectively regulate fluid communication between the outer absorption element and a fluid source, the first on/off valve being positioned between the outer absorption element and the first check valve and being configured to selectively permit fluid flow between the outer absorption element and the first check valve;

a second on/off valve in series with a second check valve configured to selectively regulate fluid communication between the inner absorption element and the fluid source, the second on/off valve being positioned between the inner absorption element and the second check valve and being configured to selectively permit fluid flow between the inner absorption element and the second check valve;

wherein, the first on/off valve is configured to be opened to bring the first check valve in fluid communication with the outer absorption element, the first check valve is calibrated to permit fluid flow into the outer absorption element until the first fluid is pressurized to the first pressure, whereupon the first check valve is configured to close; and and wherein, the second on/off valve is configured to be opened to bring the second check valve in fluid communication with the first inner absorption element, the second check valve is calibrated to permit fluid flow into the first inner absorption element until the second fluid is pressurized to the second pressure, whereupon the second check valve is configured to close.

3. The impact absorber of claim 1 wherein:

the first inner absorption element includes a first set of properties comprising a first wall thickness, a first flexural modulus, and a first material; and the second inner absorption element includes a second set of properties comprising a second wall thickness, a second flexural modulus, and a second material;

wherein at least one property of the first set of properties differs from at least one similar property of the second set of properties.

4. The impact absorber of claim 3 wherein the first wall thickness differs from the second wall thickness.

5. The impact absorber of claim 3 wherein the first cross-sectional wall shape and the second cross-sectional wall shape are each one of a polygon, a circle, an ellipse, a triangle, a rectangle, a square, a pentagon, a vesica piscis, or a hexagon.

6. The impact absorber of claim 1 wherein the outer absorption element is an outer elongated tube and the first inner absorption element is a first inner elongated tube.

7. The impact absorber of claim 1 wherein the first wall of the first inner absorption element is configured as an inflated panel with the first chamber being defined within the inflated panel, the first chamber being divided at least in part by an elongated seam to define a first elongated chamber and a second elongated chamber.

8. The impact absorber of claim 7 wherein the first chamber is further divided at least in part by a second elongated seam to define a third elongated chamber and a fourth elongated chamber;

and wherein the first elongated seam is arranged in a first direction and the second elongated seam is arranged in a second direction differing from the first direction;

and wherein the first elongated chamber and the second elongated chamber are in fluid communication with the third elongated chamber and the fourth elongated chamber.

9. The impact absorber of claim 8 wherein the first elongated seam and the second elongated seam intersect to form a manifold region wherein at least one of the first elongated chamber and the second elongated chamber intersects at least one of the first elongated chamber and the second elongated chamber, and wherein at least some of the fluid communication occurs through the manifold region.

10. The impact absorber of claim 9 wherein the inflated panel is furcated to form a first impact zone and a second impact zone, each of the first impact zone and the second impact zone extending separately from a common impact zone, wherein the second fluid is permitted to travel between the first impact zone and the second impact zone through the manifold region.

11. The impact absorber of claim 7 wherein the second wall of the second inner absorption element is configured as a second inflated panel with the second chamber being defined within the second inflated panel, the second chamber being divided at least in part by a third elongated seam to define a fifth elongated chamber and a sixth elongated chamber, the fifth elongated chamber in fluid communication with the sixth elongated chamber, the inflated panel layered atop the second inflated panel.

12. An impact absorber configured to be positioned between a protected object and an impacted object during use, the impacted object configured to be impacted by an outside object, the impact absorber comprising:

an outer absorption element comprising an outer wall enclosing a primary chamber, the primary chamber configured to hermetically contain a first fluid under a first pressure, the outer wall comprising an impacted side and a protected side, the protected side being configured to be directed toward the protected object during use, and the impacted side being configured to be directed toward the impacted object during use; and a first inner absorption panel comprising a first wall enclosing a first chamber, a first width of the first chamber being divided longitudinally at least in part by a first elongated seam to define a first elongated chamber with a first elongated chamber cross-sectional shape and a second elongated chamber with a second elongated chamber cross-sectional shape, the first elongated chamber being in fluid communication with the second elongated chamber, the first inner absorption panel being positioned within the primary chamber with the first chamber being surrounded by the first fluid, the first chamber configured to hermetically contain a second fluid under a second pressure, the first inner absorption panel being positioned adjacent to the impacted side; and a second inner absorption panel comprising a second wall enclosing a second chamber, a second width of the second chamber being divided longitudinally at least in part by a second elongated seam to define a third elongated chamber with a third elongated chamber cross-sectional shape and a fourth elongated chamber with a fourth elongated chamber cross-sectional shape, the third elongated chamber being in fluid communication with the fourth elongated chamber, the second inner absorption panel being positioned within the primary chamber with the second chamber being surrounded by the first fluid, the second chamber configured to hermetically contain a third fluid under a third pressure, the second inner absorption panel being positioned between the first inner absorption element and the protected side with the first inner absorption panel layered atop the second inner absorption panel, the first elongated chamber cross-sectional shape and the second elongated chamber cross-sectional shape being different than the third elongated chamber cross-sectional shape and the fourth elongated chamber cross-sectional shape.

13. The impact absorber of claim 12 wherein the first elongated chamber cross-sectional shape, the second elongated chamber cross-sectional shape, the third elongated chamber cross-sectional shape, and the fourth elongated chamber cross-sectional shape are each one of a polygon, a circle, an ellipse, a triangle, a rectangle, a square, a pentagon, a vesica piscis, or a hexagon.

14. The impact absorber of claim 12 wherein:

the first inner absorption panel includes a first set of properties comprising a first wall thickness, a first flexural modulus, and a first material; and the second inner absorption element includes a second set of properties comprising a second wall thickness, a second flexural modulus, and a second material;

wherein at least one property of the first set of properties differs from at least one similar property of the second set of properties.

15. An impact absorber configured to be positioned between a protected object and an impacted object during use, the impacted object configured to be impacted by an outside object, the impact absorber comprising:

an outer absorption element comprising an outer wall enclosing a primary chamber, the primary chamber configured to contain a first fluid, the outer wall comprising an impacted side and a protected side;

a first inner absorption element comprising a first wall with a first cross-sectional wall shape enclosing a first chamber, the first inner absorption element being positioned within the primary chamber and substantially surrounded by the first fluid, the first chamber configured to contain a second fluid, the first inner absorption element is positioned adjacent to the impacted side with the first chamber longitudinally arranged alongside the impacted side so that the second fluid is permitted to flow from a first portion of the impacted side to a second portion of the impacted side apart from the first portion through the first chamber; and wherein the first wall of the first inner absorption element is configured as an inflated panel with the first chamber being defined within the inflated panel, the first chamber being divided at least in part by an elongated seam to define a first elongated chamber and a second elongated chamber;

and wherein the first chamber is further divided at least in part by a second elongated seam to define a third elongated chamber and a fourth elongated chamber, the first elongated seam is arranged in a first direction and the second elongated seam is arranged in a second direction differing from the first direction, and the first elongated chamber and the second elongated chamber are in fluid communication with the third elongated chamber and the fourth elongated chamber.

16. The impact absorber of claim 15 wherein the first elongated chamber has a first elongated chamber cross-sectional size that includes a portion of reduced cross-sectional size.

17. The impact absorber of claim 15 further comprising:

a second inner absorption element comprising a second wall with a second cross-sectional wall shape enclosing a second chamber, the second inner absorption element being positioned within the primary chamber and being substantially surrounded by the first fluid, the second chamber configured to contain a third fluid, the second inner absorption element being positioned between the first inner absorption element and the protected side, with the second chamber arranged substantially parallel to the first chamber so that the third fluid is permitted to flow from the first portion of the impacted side to the second portion of the impacted side apart from the first portion through the second chamber, the first cross-sectional wall shape is different than the second cross-sectional wall shape;

wherein the second wall of the second inner absorption element is configured as a second inflated panel with the second chamber being defined within the second inflated panel, the second chamber being divided at least in part by a third elongated seam to define a third elongated chamber and a fourth elongated chamber;

and wherein the second chamber is further divided at least in part by a fourth elongated seam to define a fifth elongated chamber and a sixth elongated chamber, the fourth elongated seam is arranged in the first direction and the fifth elongated seam is arranged in the second direction, and the third elongated chamber and the fourth elongated chamber are in fluid communication with the fifth elongated chamber and the sixth elongated chamber.

18. The impact absorber of claim 17 wherein the first elongated chamber cross-sectional shape, the second elongated chamber cross-sectional shape, the third elongated chamber cross-sectional shape, and the fourth elongated chamber cross-sectional shape are each one of a polygon, a circle, an ellipse, a triangle, a rectangle, a square, a pentagon, a vesica piscis, or a hexagon.

* * * * *